(12) United States Patent
Stopa et al.

(10) Patent No.: US 12,136,139 B2
(45) Date of Patent: Nov. 5, 2024

(54) METHOD AND SYSTEM FOR AUTOMATED GENERATION OF REPRESENTATIVE ICONS FROM IMAGES

(71) Applicant: Konica Minolta Business Solutions U.S.A., Inc., San Mateo, CA (US)

(72) Inventors: Michael Stopa, San Mateo, CA (US); Jun Amano, Hillsborough, CA (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 63 days.

(21) Appl. No.: 17/710,720

(22) Filed: Mar. 31, 2022

(65) Prior Publication Data

US 2023/0316592 A1  Oct. 5, 2023

(51) Int. Cl.
*G06T 11/00* (2006.01)
*G06N 3/08* (2023.01)

(52) U.S. Cl.
CPC .............. *G06T 11/00* (2013.01); *G06N 3/08* (2013.01)

(58) Field of Classification Search
CPC ................................ G06T 11/00; G06N 3/08
See application file for complete search history.

(56) References Cited

U.S. PATENT DOCUMENTS

| | | | |
|---|---|---|---|
| 8,841,535 B2 | 9/2014 | Collins | |
| 10,783,398 B1* | 9/2020 | Ranzinger | G06F 16/56 |
| 11,099,816 B2 | 8/2021 | Kumar et al. | |
| 11,373,117 B1* | 6/2022 | Cui | G06F 16/285 |
| 2009/0006989 A1* | 1/2009 | Park | H04N 1/00464 |
| | | | 358/1.13 |
| 2021/0192800 A1* | 6/2021 | Dutta | G06F 40/205 |
| 2022/0148241 A1* | 5/2022 | Park | G06T 11/00 |
| 2022/0392126 A1* | 12/2022 | van der Meulen | G06T 11/60 |
| 2023/0154161 A1* | 5/2023 | Pham | G06V 10/776 |
| | | | 382/156 |

FOREIGN PATENT DOCUMENTS

| | | | | |
|---|---|---|---|---|
| CN | 107423701 A | * | 12/2017 | G06F 18/214 |
| KR | 20210124727 A | * | 10/2021 | G06T 5/002 |
| WO | WO 2021/183256 A1 | * | 9/2021 | G06N 3/045 |

OTHER PUBLICATIONS

Karamatsu et al. "Iconify: Converting Photographs into Icons", Jun. 8, 2020, MMArt-ACM'20, p. 7-12 (Year: 2020).*
Robert Lie; "Icon generator" Mobilefish.com; Retrieved from the Internet: URL: https://www.mobilefish.com/services/icon/icon.php (2 pages).

* cited by examiner

*Primary Examiner* — Ryan R Yang
(74) *Attorney, Agent, or Firm* — Osha Bergman Watanabe & Burton LLP

(57) ABSTRACT

A method for automated generation of representative icons from images involves obtaining an image, generating an image vector from the image using an encoder deep neural network, generating an icon based on the image vector using a generative adversarial network (GAN), and outputting the icon.

20 Claims, 17 Drawing Sheets

METHOD AND SYSTEM FOR AUTOMATED GENERATION OF REPRESENTATIVE ICONS FROM IMAGES

BACKGROUND

The use of abstract, pictographic representations of things and actions is ubiquitous in modern society from text message adornment to highway signs to company logos. These abstract, pictographic representations of things and actions using images (e.g., photographs, drawings) and/or icons (e.g., shapes, logos, and emojis) are typically selected to represent an emotion, an action, object, or another concept. However, it can be difficult and time consuming to select an icon from various preexisting alternatives by searching a library with potentially tens of thousands of icons to accurately represent the intended emotion and concept of the user. Likewise, the selected icon may have issues of copyright infringement related to pre-existing icons. Therefore, it may be desirable to use an automated method to generate rather than select an icon.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method comprising: obtaining an image; generating an image vector from the image using an encoder deep neural network; generating an icon based on the image vector using a generative adversarial network (GAN); and outputting the icon.

In general, in one aspect, embodiments relate to a system comprising: an icon generation engine comprising at least one processor, the icon generation engine configured to: obtain an image; generate an image vector from the image using an encoder deep neural network; generate an icon based on the image vector using a generative adversarial network (GAN); and output the icon.

In general, in one aspect, embodiments relate to a non-transitory machine-readable medium comprising a plurality of machine-readable instructions executed by one or more processors, the plurality of machine-readable instructions causing the one or more processors to perform operations comprising: obtaining an image; generating an image vector from the image using an encoder deep neural network; generating an icon based on the image vector using a generative adversarial network (GAN); and outputting the icon.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1A:
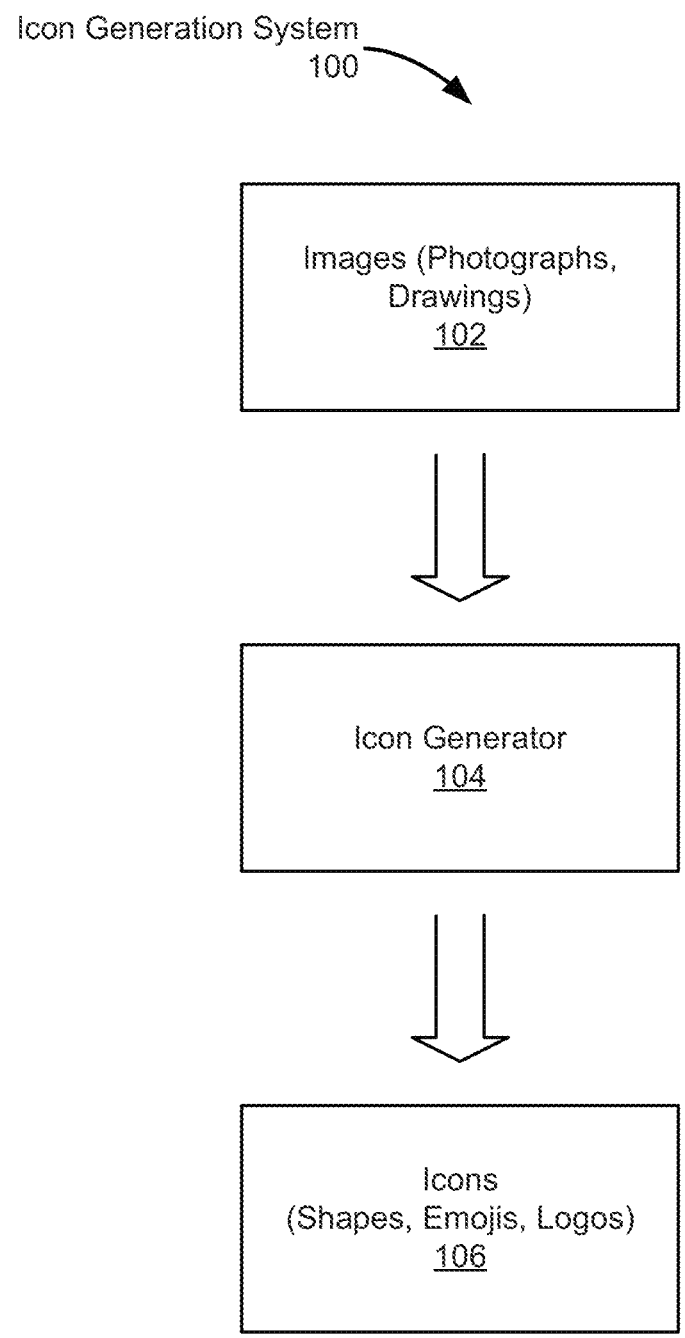
FIGS. 1A and 1B show systems in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for automatically generating representative icons from images. The systems and methods may use one or more machine learning (ML) algorithms (e.g., a deep learning neural network and/or a generative adversarial neural network (GAN)) to generate the icon (e.g., a shape, emoji, logo, etc.) based on the image (e.g., a photograph, a drawing, etc.). The icon may represent a concept such as an action (e.g., "people fighting", "people laughing", "people hugging", etc.), an emotion, an object, etc., that is present in the image. While the icon is an abstraction of the image, it may accurately represent the concept found in the image, in accordance with one or more embodiments. There are many applications and benefits associated with the automatic generation of representative icons from images. The icon may be used in various applications such as for entertainment, to label or annotate documents, to issue warnings, or for any other communication purpose. The ability to use existing images to generate an icon may be beneficial to a user who needs or wants to communicate a concept in the form of an icon. Embodiments of the disclosure free users from the burden of having to select a suitable icon from many preexisting alternatives. The method and system may be used by artists, designers, product managers, texting users, etc. In contrast to searching a library with potentially tens of thousands of icons, methods and system in accordance with embodiments of the disclosure take ideas in the form of pictures or natural language descriptions and creates the icon image from the concept. Unlike an icon picked from a library, the icon generated in accordance with embodiments of the disclosure may have the benefit that there are no copyright restrictions, i.e., it may be freely used. The generated icons, logos, and emojis may be simple and may require very small amounts of storage and may be particularly suitable to communicate using portable devices. Embodiments of the disclosure may also be used for labeling within libraries of images. Images may be labeled with one or more icons, to indicate the content of the images.

In one or more embodiments, the automatic icon generation system uses a first machine learning algorithm (e.g., a deep learning neural network, a convolution neural network) to determine an abstract lower-dimensional representation of an image in a joint image-icon vector space. Further, the automatic icon generation system, in one or more embodiments, uses a second machine learning algorithms (e.g., a generative adversarial neural network) to generate an icon based on the lower-dimensional representation of the image in the joint image-icon vector space. The automatic icon generation system may further translate the generated icon into a caption using a natural language string of words, including but not limited to a description of the objects, people or creatures in the images and the activities that are taking place. The icon and caption may be displayed to a user via a graphical user interface, for example to convey information to the user (e.g. about an object, a conflict or issue, etc.) and/or to share the icon with the user, for further use by the user. In some embodiments, the generated icon and/or caption may be updated based on real-time images obtained from a user device or a user.

Similar to the generation of an icon from an image, in one or more embodiments, an image may be generated from an icon. Referring to FIGS. 1A, 1B, 2, 3, 4, 5, 6, 7, and 15, the following discussion covers the generation of an icon from an image. Referring to FIGS. 8A, 8B, 9, 10, 11, 12, 13, 14, and 15, the following discussion covers the generation of an image from an icon.

Figure 1B:
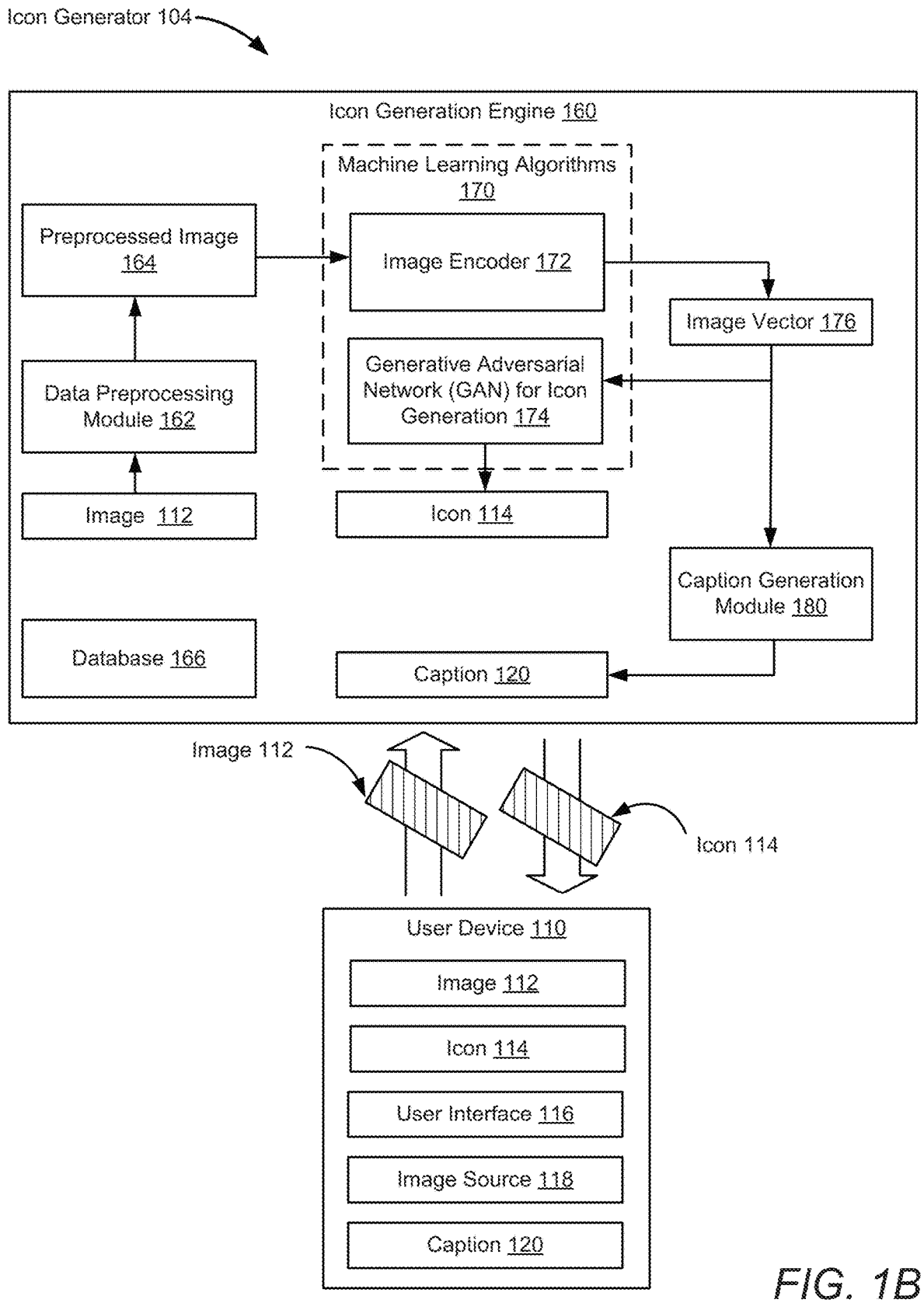

Turning to FIGS. 1A and 1B, FIG. 1A shows a system in accordance with one or more embodiments. As shown in FIG. 1A, an icon generation system (100) may obtain images (e.g., photographs, drawings) (102) and apply an icon generator (104) based on machine learning to generate icons (e.g., shapes, emojis, logos) (106).

FIG. 1B shows an icon generator in accordance with one or more embodiments. As shown in FIG. 1B, the icon generator (104) may include an icon generation engine (160). The icon generator (104) may further include one or more user devices (110) to enable a user to interact with the icon generation engine (160), e.g., by providing an image for which an icon is to be generated and receiving the generated icon. The icon generation engine (160) may obtain the image (112) from the user device (110). The image (112) may be selected, e.g., by a user of the user device (110), from a set of photographs and/or drawings via a user interface (116). Alternatively, the image may be provided by the user. For example, the user may capture the image (112) using a camera (not shown) of the user device (110). The image may be obtained in any manner, without departing from the disclosure.

In some embodiments, the user device (110) may be a personal computer, a laptop, a tablet, a smartphone, etc., that includes hardware and/or software with functionality for obtaining one or more images (112) from an image source (118) such as a file, a database, a camera, etc. The user device (110) may include hardware and/or software to receive user selections via the user interface (116). The user interface (116) may further be used to output (e.g., display) the generated icon(s) (114) to the user. The user interface (116) may also be used to output a caption (120) for the icon (114) to the user. The icon generation engine (160) may be hosted on a server, in a cloud, or on the user device (110). The user device (110) may interface with the icon generation engine (160) via any type of communication network to enable transmission of the image (112) from the user device (110) to the icon generation engine (160) and receipt of the icon (114) and/or the caption (120) from the icon generation engine (160) to the user device (110).

Figure 15:
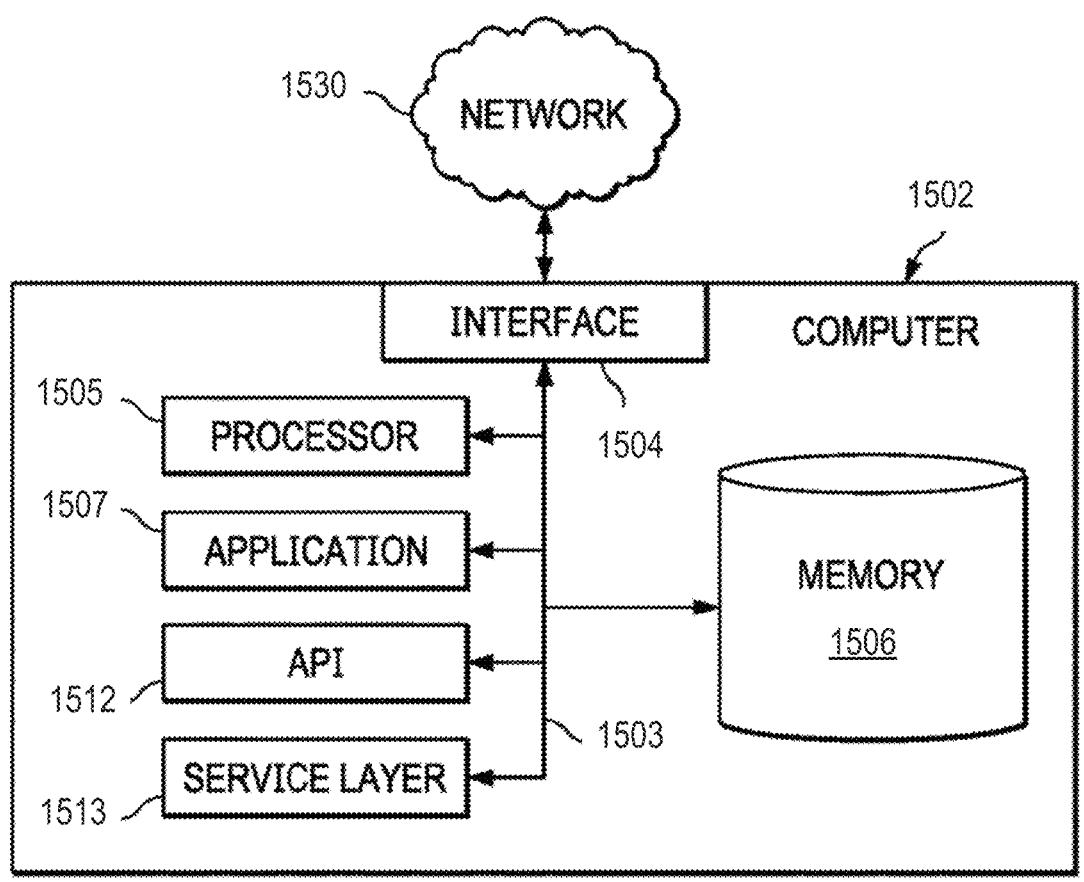
FIG. 15 shows a computer system in accordance with one or more embodiments.

Keeping with FIG. 1B, the icon generation engine (160) may include hardware and/or software with functionality for obtaining the image (112), for processing the image as discussed below, and for outputting the icon (114) and/or the caption (120), resulting from the processing of the image (112). The icon generation engine (120) may be implemented on one or more computing systems of any type, e.g., as shown in FIG. 15. Various operations of the icon generation engine may be performed by one or more machine learning models.

The machine learning model(s) may be any type of machine learning model(s). Examples for machine learning models that may be used include, but are not limited to, perceptrons, convolutional neural networks, deep neural networks, recurrent neural networks, support vector machines, regression trees, random forests, extreme learning machines, type I and type II fuzzy logic (T1FL/T2FL), decision trees, inductive learning models, deductive learning models, supervised learning models, unsupervised learning models, reinforcement learning models, etc. In some embodiments, two or more different types of machine-learning models are integrated into a single machine-learning architecture, e.g., a machine-learning model may include support vector machines and neural networks.

In some embodiments, various types of machine learning algorithms, e.g., backpropagation algorithms, may be used to train the machine learning models. In a backpropagation algorithm, gradients are computed for each hidden layer of a neural network in reverse from the layer closest to the output layer proceeding to the layer closest to the input layer. As such, a gradient may be calculated using the transpose of the weights of a respective hidden layer based on an error function (also called a "loss function"). The error function may be based on various criteria, such as mean squared error function, a similarity function, etc., where the error function may be used as a feedback mechanism for tuning weights in the machine-learning model. In some embodiments, existing training data, e.g., images may be augmented to generate synthetic data for training a machine learning model.

With respect to neural networks, for example, a neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled.

Through machine learning, a neural network may determine which data inputs should receive greater priority in determining one or more specified outputs of the neural network. Likewise, these weighted data inputs may be summed such that this sum is communicated through a neuron's activation function to other hidden layers within the neural network. As such, the activation function may determine whether and to what extent an output of a neuron progresses to other neurons where the output may be weighted again for use as an input to the next hidden layer.

Turning to recurrent neural networks, a recurrent neural network (RNN) may perform a particular task repeatedly for multiple data elements in an input sequence (e.g., a sequence of maintenance data or inspection data), with the output of the recurrent neural network being dependent on past computations (e.g., failure to perform maintenance or address an unsafe condition may produce one or more hazard incidents). As such, a recurrent neural network may operate with a memory or hidden cell state, which provides information for use by the current cell computation with respect to the current data input. For example, a recurrent neural network may resemble a chain-like structure of RNN cells, where different types of recurrent neural networks may have different types of repeating RNN cells. Likewise, the input sequence may be time-series data, where hidden cell states may have different values at different time steps during a prediction or training operation. For example, where a deep neural network may use different parameters at each hidden layer, a recurrent neural network may have common parameters in an RNN cell, which may be performed across multiple time steps. To train a recurrent neural network, a supervised learning algorithm such as a backpropagation algorithm may also be used. In some embodiments, the backpropagation algorithm is a backpropagation through time (BPTT) algorithm. Likewise, a BPTT algorithm may determine gradients to update various hidden layers and neurons within a recurrent neural network in a similar manner as used network is trained using a reinforcement learning algorithm such as a deep reinforcement learning algorithm.

Embodiments are contemplated with different types of RNNs. For example, classic RNNs, long short-term memory (LSTM) networks, a gated recurrent unit (GRU), a stacked LSTM that includes multiple hidden LSTM layers (i.e., each LSTM layer includes multiple RNN cells), recurrent neural networks with attention (i.e., the machine-learning model may focus attention on specific elements in an input sequence), bidirectional recurrent neural networks (e.g., a machine-learning model that may be trained in both time directions simultaneously, with separate hidden layers, such as forward layers and backward layers), as well as multidimensional LSTM networks, graph recurrent neural networks, grid recurrent neural networks, etc., may be used. With regard to LSTM networks, an LSTM cell may include various output lines that carry vectors of information, e.g., from the output of one LSTM cell to the input of another LSTM cell. Thus, an LSTM cell may include multiple hidden layers as well as various pointwise operation units that perform computations such as vector addition.

In some embodiments, one or more ensemble learning methods may be used in connection to the machine-learning models. For example, an ensemble learning method may use multiple types of machine-learning models to obtain better predictive performance than available with a single machine-learning model. In some embodiments, for example, an ensemble architecture may combine multiple base models to produce a single machine-learning model. One example of an ensemble learning method is a BAGGing model (i.e., BAGGing refers to a model that performs Bootstrapping and Aggregation operations) that combines predictions from multiple neural networks to add a bias that reduces variance of a single trained neural network model. Another ensemble learning method includes a stacking method, which may involve fitting many different model types on the same data and using another machine-learning model to combine various predictions.

Continuing with the discussion of FIG. 1B, in one or more embodiments, the data preprocessing module (162) performs image preprocessing operations on the image (112) to generate a preprocessed image (164). The image preprocessing may involve operations such as a resolution normalization, a contrast and/or brightness normalization, a grayscale conversion, etc. Any preprocessing operations needed or desired to obtain a preprocessed image in a format suitable as an input to the machine learning models (170) may be performed.

In one or more embodiments, the machine learning algorithms (170) include an image encoder (172) and a generative adversarial network (GAN) for icon generation (174).

The image encoder (172) may be a first machine learning algorithm (170) trained to generate an image vector (176) from the preprocessed image (164) An architecture of the image encoder (172) is discussed below in reference to FIG. 2, and a method for training the image encoder (172) is discussed below in reference to FIG. 5. In one or more embodiments, the image vector (176) includes a lower-dimensional representation of the preprocessed image (164) in a joint image-icon vector space. In the joint image-icon vector space, the image vector (176) may contain a condensed version of the preprocessed image (164). The joint image-icon vector space may consist of N real numbers, where N is the dimensionality of the joint image-icon vector space. While the concept needed to create the icon is still fully present in the image vector, other non-relevant or peripherally relevant content of the image may not be encoded by the image vector. In other words, the image-icon vector space is a unique representation that is between image and icon. The dimensionality of the image vector (176) may be a tunable parameter. If a classification of the image is desired, a down-stream classifier may operate on the image vector (176) to perform the classification.

The GAN for icon generation (174) may be a second machine learning algorithm (170) trained to generate the icon (114) from the image vector (176). An architecture of the GAN for icon generation (174) is discussed below in reference to FIG. 3, and a method for training the GAN for icon generation (174) is discussed below in reference to FIG. 6.

The icon (114) is a distilled visual representation of an emotion, action, object or any type of concept present in the image (112). Accordingly, the concept may be more easily recognizable in the icon than in the image which may also include other elements that may distract from the concept. The icon may come in various forms, e.g., as an emoji, a logo, a symbol, etc. Examples are provided in FIG. 7.

In some embodiments, the icon generation engine (160) further includes a caption generation module (180) that translates the image vector (176) into a caption (120). The caption (120) may include a natural language string of words, including but not limited to a description of the objects, people, actions, emotions, etc. depicted by the icon (114). The caption generation module may be based on a sequential machine learning architecture, such as a Long Short-Term Memory (LSTM) or Gated Recurrent Units (GRU) architecture, an attention based architecture such as a transformer to generate a sequence of natural language words to represent the meaning of the vector. Regardless of the type of model that is used, it is assumed that the model is guided to focus on salient features of the image or icon for the caption. In some embodiments, the generated icon (114) and caption (120) are provided as an output, e.g., from the icon generation engine (160) to the user device (110), where they may be stored, reviewed and/or used by a user.

In one or more embodiments, the icon generation engine (160) further includes a database (166). The database may store data to be used for training the machine learning algorithms (170). For example, labeled images and/or icons suitable for a supervised learning-based training of the machine learning algorithms (170) may be stored in the database (166). A discussion of the training of the machine learning algorithms using data stored in the database (166) is provided below in reference to FIGS. 5 and 6.

Figure 2:
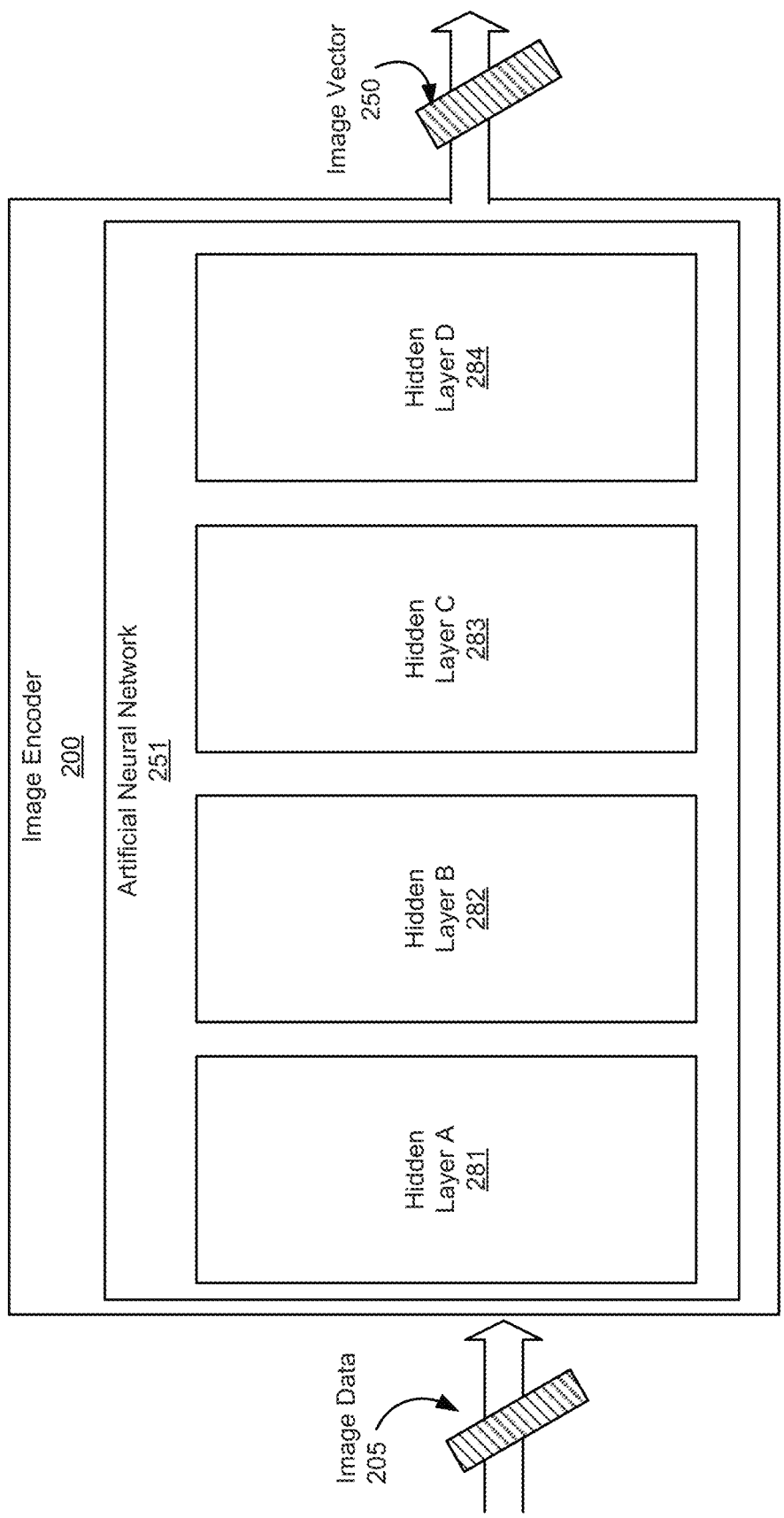
FIGS. 2 and 3 show machine learning models in accordance with one or more embodiments.

FIG. 2 shows an image encoder in accordance with one or more embodiments. The image encoder (200), in one or more embodiments, includes an artificial neural network (251), trained to generate an image vector (250) from the image data (205). Once trained, the artificial neural network (251) may serve as the image encoder (172) of FIG. 1B.

In one embodiment, the artificial neural network (251) is a deep neural network (e.g., a convolutional neural network). In the example shown in FIG. 2, the artificial neural network (251) includes four hidden layers (hidden layer A (281), hidden layer B (282), hidden layer C (283), hidden layer D (284)), which may be a convolutional layer, a pooling layer, a rectified linear unit (ReLU) layer, a softmax layer, a regressor layer, a dropout layer, and/or various other hidden layer types. These hidden layers may be arranged in any order as long as they satisfy input/output size criteria. Each layer may include a number of image filters. The output of the image filters may serve as the input to the next layer(s).

In some embodiments, each hidden layer is a combination of a convolutional layer, a pooling layer, and a ReLU layer in a multilayer architecture. For example, each hidden layer (e.g., hidden layer A (281), hidden layer B (282), hidden layer C (283), hidden layer D (284)) may have a convolutional layer, a pooling layer, and a ReLU layer. The hidden layer A (281) and the hidden layer B (282) may be downsampling blocks to extract high-level features from the image data (205). Hidden layer C (283) may perform residual stacking as a bottleneck between down-sampling blocks (e.g., hidden layer A (281), hidden layer B (282)). Hidden layer D (284) may include a softmax layer or a regressor layer to classify or predict a predetermined class or a value based on input attributes.

Furthermore, in a convolutional layer, the input is convolved with a set of learned filters, designed to highlight specific characteristics of the input. A pooling layer produces a scaled down version at the output. This is achieved by considering small neighborhood regions and applying the desired operation filter (e.g., min, max, mean, etc.) across the neighborhood. A ReLU layer enhances the nonlinear property of the network by introducing a non-saturating activation function. One example of such a function is thresholding to eliminate negative responses (setting negative values to zero). A fully connected layer provides a high-level reasoning by connecting each node in the layer to all activation nodes in the previous layer. A softmax layer maps the inputs from the previous layer into a value between 0 and 1. A dropout layer offers a regularization technique for reducing network over-fitting on the training data by dropping out individual nodes with a certain probability. A loss layer (utilized in training) defines the weight dependent cost function that needs to be optimized (bring cost down to zero) for improved accuracy. Furthermore, the artificial neural network (251) may include an activation function in a ReLU layer (e.g., hidden layer D (284)) which may be a fully connected layer to represent nonlinear combinations of high-level features at the output of convolutional layers (e.g. hidden layer A (281), hidden layer B (282), hidden layer C (283)) as a vector. As a result, the image data (205) are flattened into the image vector (250), by the artificial neural network (251). While FIG. 2 shows a particular architecture, any architecture suitable for generating the image vector (250) based on the image data (205) may be used, without departing from the disclosure.

Figure 3:
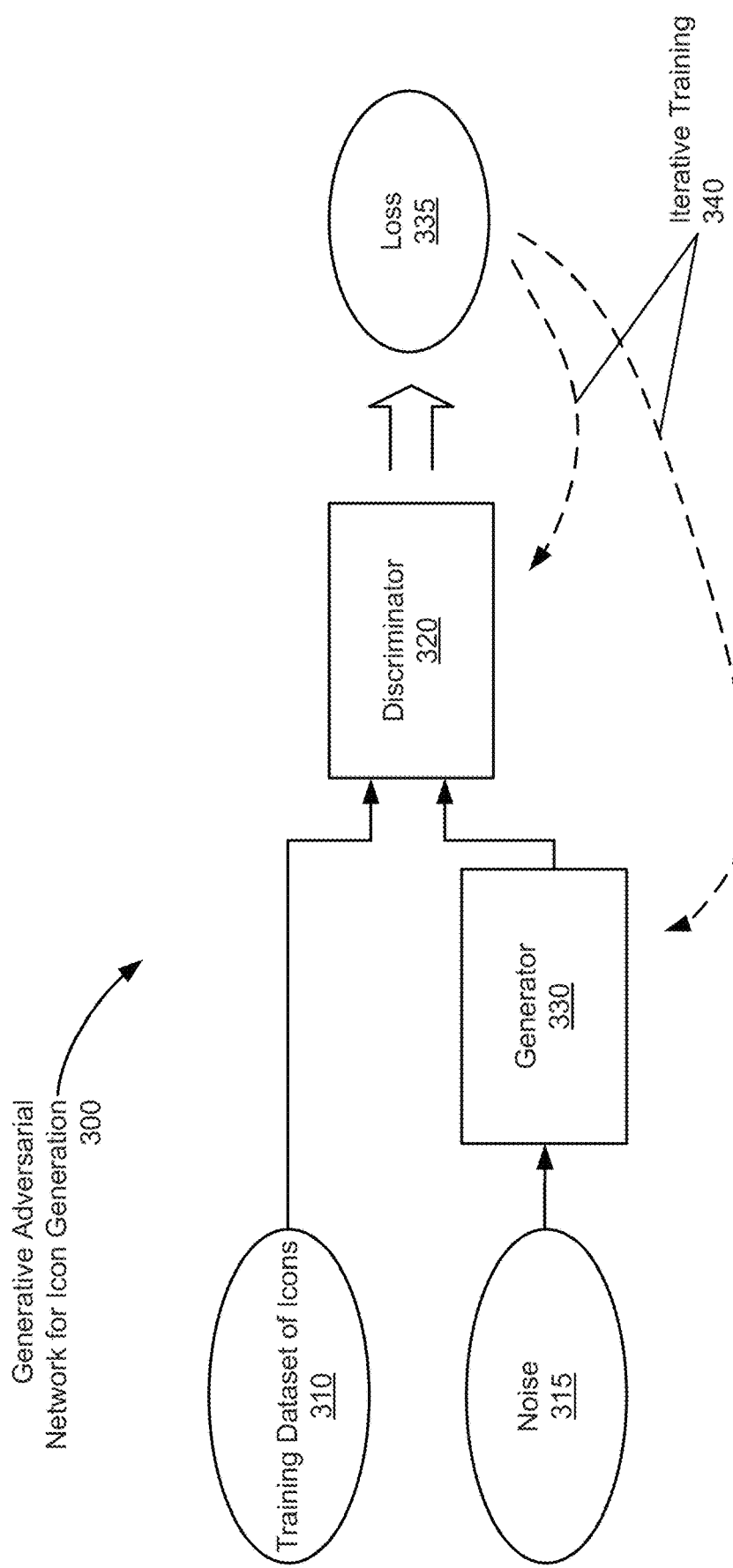

FIG. 3 shows a generative adversarial network (GAN) for icon generation in accordance with one or more embodiments. Once trained, the GAN for icon generation (300) may serve as the GAN for icon generation (174) in FIG. 1B. The GAN for icon generation (300) includes a generator (330) and a discriminator (320), in accordance with one or more embodiments. Both the generator (330) and the discriminator (320) may be neural networks. The combination of the generator (330) and the discriminator (320) may be trained using libraries of existing icons. For example, to train the GAN for icon generation to generate an icon for the activity "people fighting", a library of icons known to represent people that are fighting may be used.

During the training of the GAN for icon generation (300), the generator (330) is provided with noise as the input (315). Further, the training dataset of icons (310) provides the reference for the discriminator (320) to decide whether an icon generated by the generator (330) is real or fake. A loss (335) output provided by the discriminator may be used for an iterative training (340) of the GAN for icon generation (300). With the iterative training (340), the capability of the GAN for icon generation (300) to generate icons that resemble the icons in the training dataset of icons (310), and eventually are no longer distinguishable from the icons in the training dataset of icons (310) improves.

Both the generator (330) and the discriminator (320) may be neural networks. The discriminator (320) may be a classifier that is trained to distinguish real icons from the icons created by the generator (330). The discriminator may use any network architecture appropriate to the classification of icons. The generator (330) may be an inverse convolutional network. While a standard convolutional classifier takes an image and downsamples the image to produce a probability, the inverse convolutional network of the generator (330) takes a vector of random noise and upsamples it to an image (icon). The generator (330) output may be connected directly to the discriminator (320) input. Through backpropagation, the discriminator's classification provides a signal that the generator uses to update its weights. Once sufficiently trained, the generator (330) may generate an icon from the noise (315), without the discriminator (320) being involved. A description of the training of the GAN for icon generation is provide below in reference to FIG. 6. Although not shown in FIG. 3, in one or more embodiments, the GAN for icon generation (300) includes an additional input for the image vector. The image vector may condition the GAN, depending on what the image vector represents. For example, if the image vector represents the concept "people fighting", the GAN may be conditioned to generate an icon that represents the concept of "people fighting". In other words, the GAN for icon generation may operate as a conditional GAN.

While FIGS. 1A, 1B, 2, and 3 show various configurations of components, other configurations may be used without departing from the scope of the disclosure. For example, various components in FIGS. 1B, 2, and 3 may be combined to create a single component. As another example, the functionality performed by a single component may be performed by two or more components.

Figure 4:
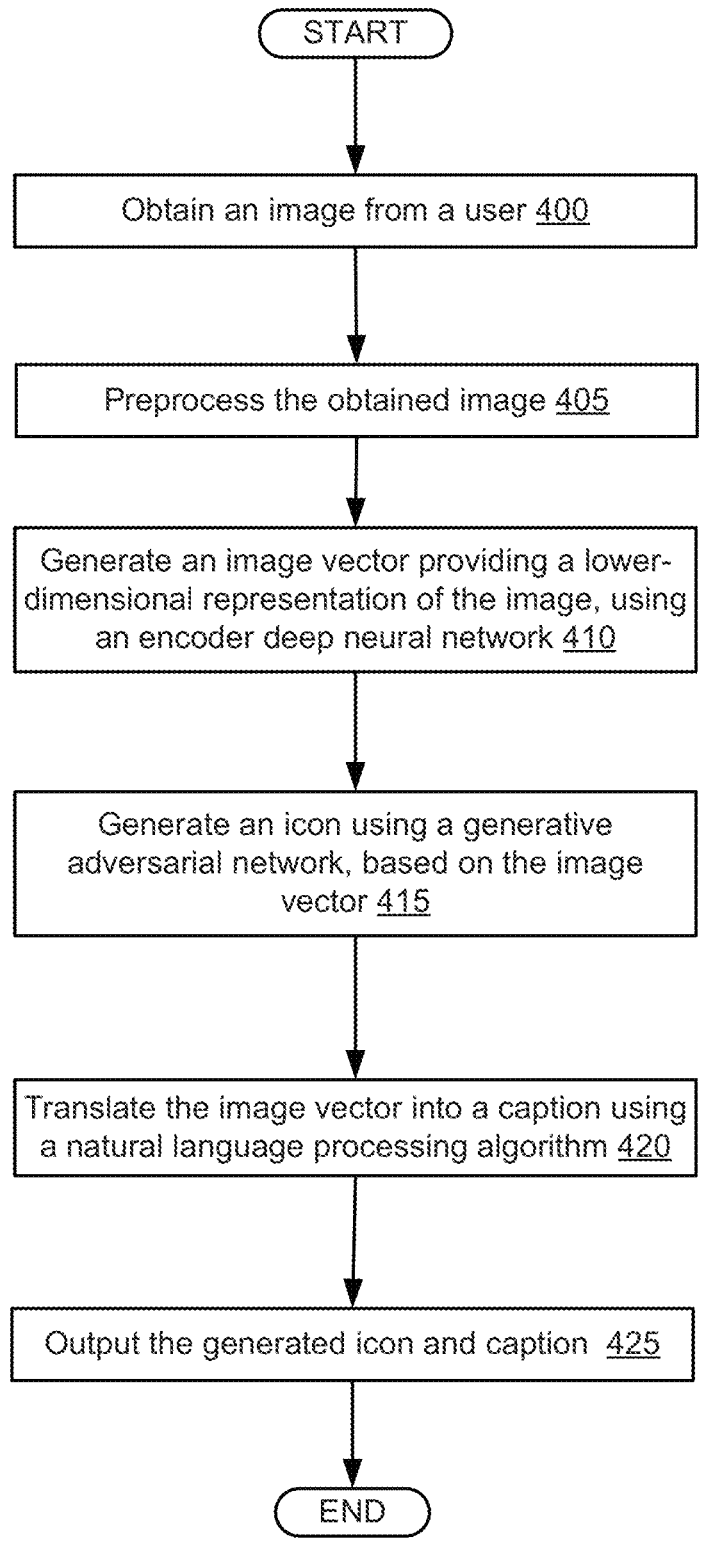
FIGS. 4, 5, and 6 show flowcharts in accordance with one or more embodiments.

Turning to FIG. 4, FIG. 4 shows a flowchart in accordance with one or more embodiments. Specifically, FIG. 4 describes a general method for generating an icon based on an image, in accordance with one or more embodiments. One or more blocks in FIG. 4 may be performed by one or more components (e.g., an image encoder (200), a generative adversarial network for icon generation (300)) as described in FIGS. 1B, 2, and 3. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, an image is obtained from a user in accordance with one or more embodiments. For example, the image is typically selected by a user device or a user to represent an emotion and concept (e.g., a concept of "people fighting"). As another example, the image includes photographs and/or drawings stored in a database.

In Block 405, the obtained image is preprocessed in accordance with one or more embodiments. For example, the obtained image may be normalized in size contrast, etc. The preprocessing may include operations as previously described in reference to FIG. 1B.

In Block 410, an image vector is generated from the image, after the preprocessing. The image vector may be generated by an image encoder operating on the preprocessed image, as described in reference to FIG. 1B. The image vector may be in a joint image-icon vector space and may encode the concept to be represented by an icon. Prior to the execution of Block 410, the image encoder may be trained as described below in reference to FIG. 5.

In Block 415, an icon is generated using a generative adversarial network (GAN) based on the image vector, in accordance with one or more embodiments. The icon may be generated by the GAN operating on a noise input. More specifically, a generator (previously described in reference to FIG. 3) may generate the icon from the noise at the input of the generator. Accordingly, depending on the noise, different icons may be generated by the GAN, although all icons that are generated may represent the concept encoded by the image vector (e.g., concepts such as "people fighting", "people talking", "people dancing" or any other concept as previous defined). The image vector may serve as a conditional input that conditions the GAN to generate an icon according to the concept encoded by the image vector. Prior to the execution of Block 415, the GAN may be trained as described below in reference to FIG. 6.

In Block 420, the image vector is translated into a caption using a natural language processing algorithm in accordance with one or more embodiments. For example, the icon generation engine maps the image vector to a caption in a predetermined list of captions (e.g., "people laughing", "people fighting", "people drinking", "people playing").

In Block 425, the generated icon and caption are outputted in accordance with one or more embodiments. For example, a user device may display the generated icon and caption for a user to evaluate if the generated icon and caption are consistent with the intended emotions and contents for a user. Further, the generate icon and/or caption may be stored, shared, etc.

While not explicitly shown in FIG. 4, the method may select an icon from a library of icons, instead of generating the icon. In the library, the icons may be labeled to indicate the concept(s) associated with the icons in the library. For example, an icon vector similar to the image vector may be assigned to each icon. In this case, the selection of the icon from the library may be performed by picking the icon for which the icon vector is closest to the image vector. Any other method for selection of an icon may be used without departing from the disclosure. If the icon is selected rather than generated, the execution of Block 415 may not be necessary.

Figure 5:
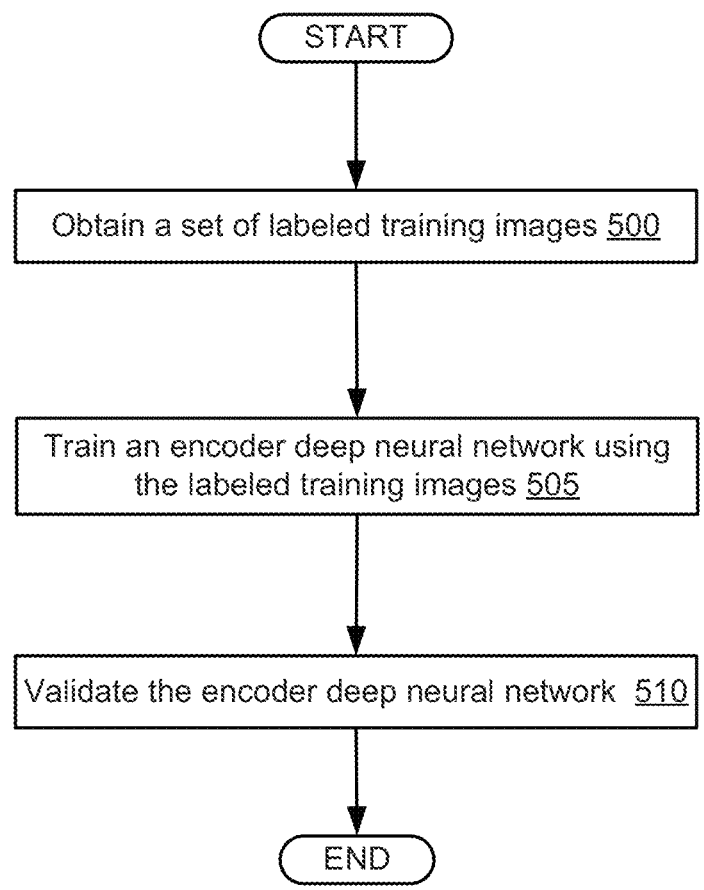
Figure 6:
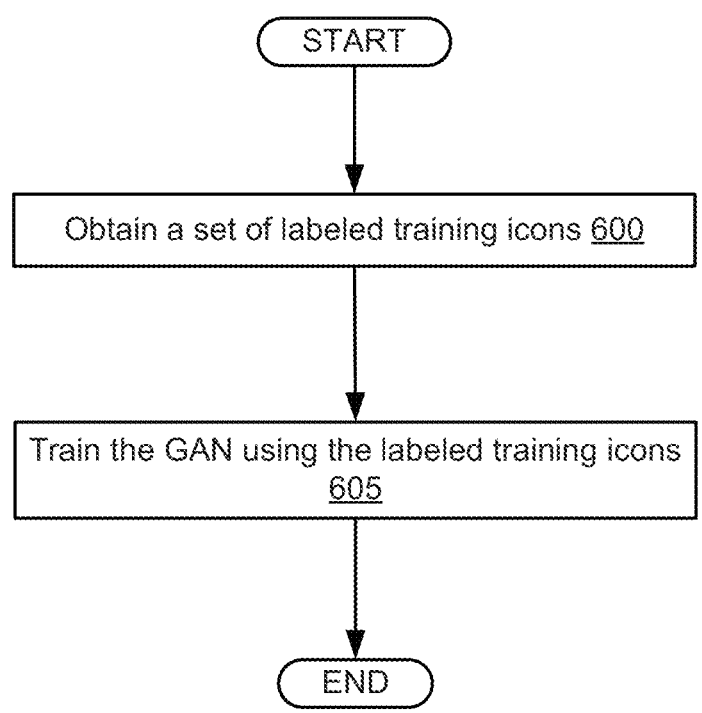

The following flowcharts of FIGS. 5 and 6 describe methods for training the machine learning algorithms that may be used for the execution of the method of FIG. 4. The machine learning models may be jointly or alternatingly trained to maximize performance.

FIG. 5 shows a flowchart in accordance with one or more embodiments. Specifically, FIG. 5 describes a method for training an image encoder. While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 500, a set of labeled training images is obtained in accordance with one or more embodiments. For example, the set of training images includes photographs and/or drawings that are labeled to identify one or more concepts (e.g., "people fighting", "people laughing", "people hugging", etc.) present in the training images. An example of a database that may be used for training is the ImageNet database (www.image-net.org). Any other database that provides labeled training images may be used without departing from the disclosure.

In Block 505, the image encoder, e.g., an encoder deep neural network, is trained using the labeled training images in accordance with one or more embodiments. Any type of supervised learning as previously described may be used to train the image encoder, using the training images and the corresponding labels.

In Block 510, the image encoder that is being trained is validated in accordance with one or more embodiments. Iterations of the training of Block 505 and the validation of Block 510 may be performed until satisfactory performance (e.g., a desired classification accuracy) is achieved or until a prespecified number of iterations have been completed. A data split technique may be used to separate the available set of training images into sets for training and validation. For example, a 70/30 or 80/20 split may be used.

FIG. 6 shows a flowchart in accordance with one or more embodiments. Specifically, FIG. 6 describes a method for training a GAN for icon generation. While the various blocks in FIG. 6 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 600, a set of labeled training icons is obtained in accordance with one or more embodiments. For example, the set of training icons includes icons that are labeled to identify one or more concepts (e.g., "people fighting", "people laughing", "people hugging", etc.) represented by the training icons. An example of a database that may be used for training is the Remix Icon database (remixicon-.com). Any other database that provides labeled training icons may be used without departing from the disclosure.

In Block 605, a generative adversarial network (GAN) is trained using the labeled training icons in accordance with one or more embodiments. The training may involve the training of the discriminator and the training of the generator of the GAN.

The training of the discriminator may be performed based on real data and fake data. The real data may include icons that properly represent a concept, whereas the fake data may include icons that improperly represent the concept. The real data may be sampled from the labeled training icons. The fake data may be obtained by shuffling the labels of the labeled training icons, or using otherwise improperly labeled icons. The discriminator may be trained to perform a binary classification task using the real and the fake data. Any kind of supervised training method, e.g., using backpropagation, may be used. The generator may not be trained while the discriminator is trained.

The training of the generator may be performed using the discriminator, the labeled training icons, and the noise input. During the training, the generator learns to generate icons that are no longer distinguishable from the labeled training icons, by the discriminator. Because of the randomness in the noise input, the generated icons have variations, despite being indistinguishable from the labeled training icons, by the discriminator. The generator feeds into the discriminator, and the discriminator produces an output to be optimized by the training. More specifically, the generator is penalized for producing an icon that the discriminator network classifies as fake. Accordingly, the discriminator is included in the backpropagation, and the backpropagation adjusts the weights of the generator to increase the likeliness that the produced icon is no longer recognized as a fake. The training may continue until a satisfactory performance (e.g., a percentage of detected fakes below a prespecified threshold) is achieved. The described training may be performed for different image vectors representing different concepts. Further, as part of the training, the image encoder may be updated, i.e., the training may alternate between the methods of FIGS. 5 and 6 to optimize overall performance.

Figure 7:
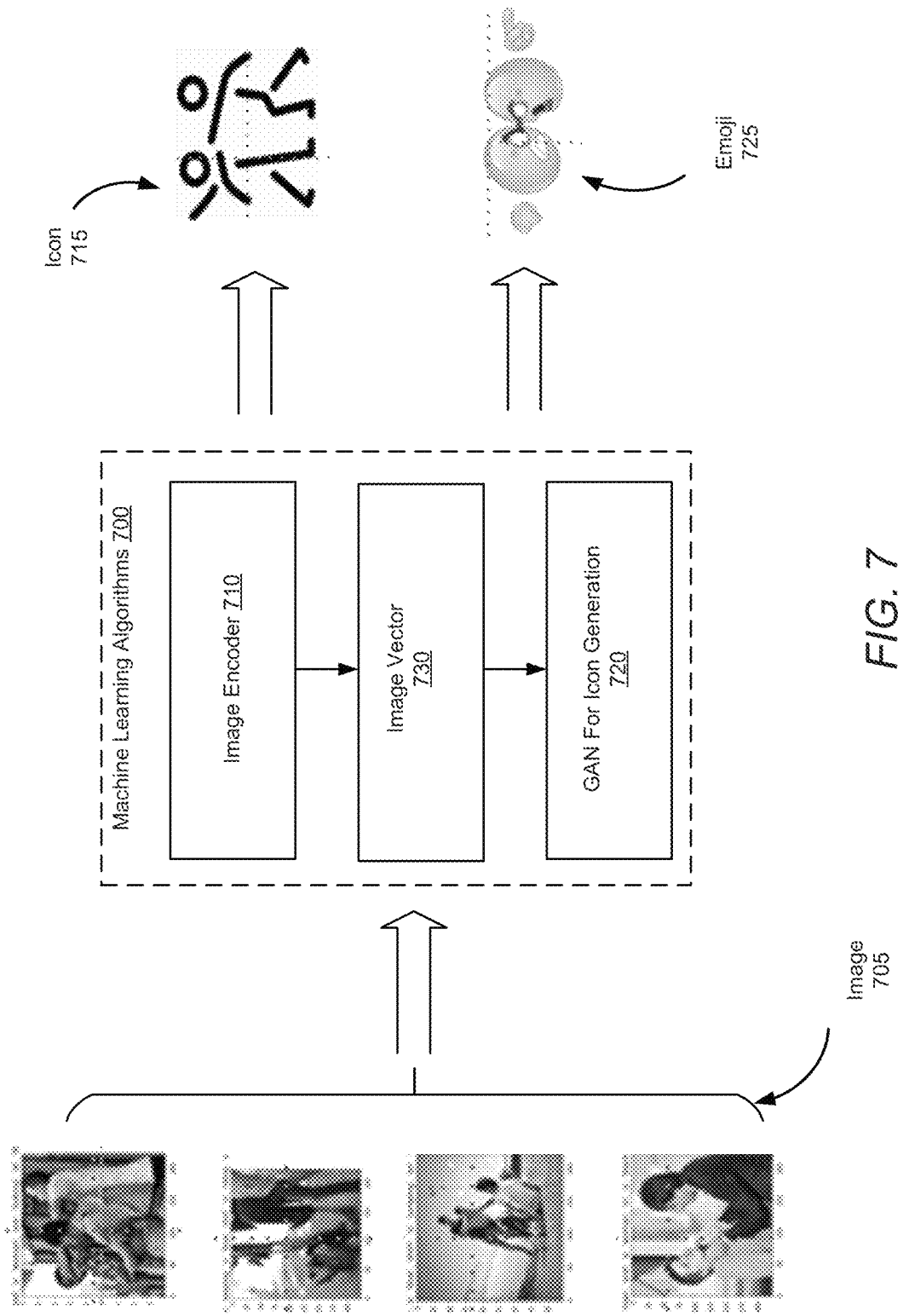
FIG. 7 shows an example in accordance with one or more embodiments.

FIG. 7 shows an example of a method for automated generation of representative icons using machine learning algorithms (700). In the example, an image encoder (710) processes an input image (e.g., one of the images (705)) to generate an image vector (730). Next, a GAN for icon generation (720) produces an icon (715) or emoji (725) based on the image vector (730). Whether the icon (715) or the emoji (725) is generated may depend on the noise input to the GAN for icon generation (720). In other words, for the same image (705), different outputs, in this case representing the concept "people fighting" may be generated.

Figure 8A:
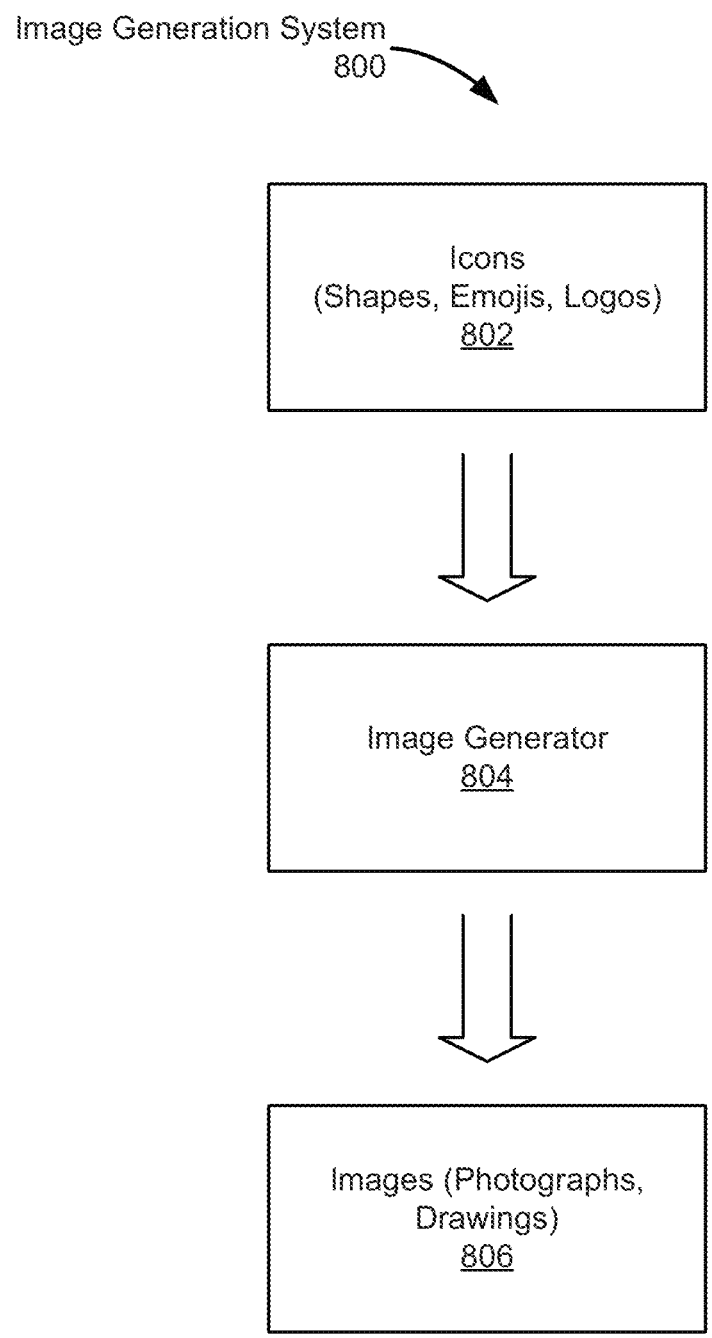
FIGS. 8A and 8B show systems in accordance with one or more embodiments.
Figure 8B:
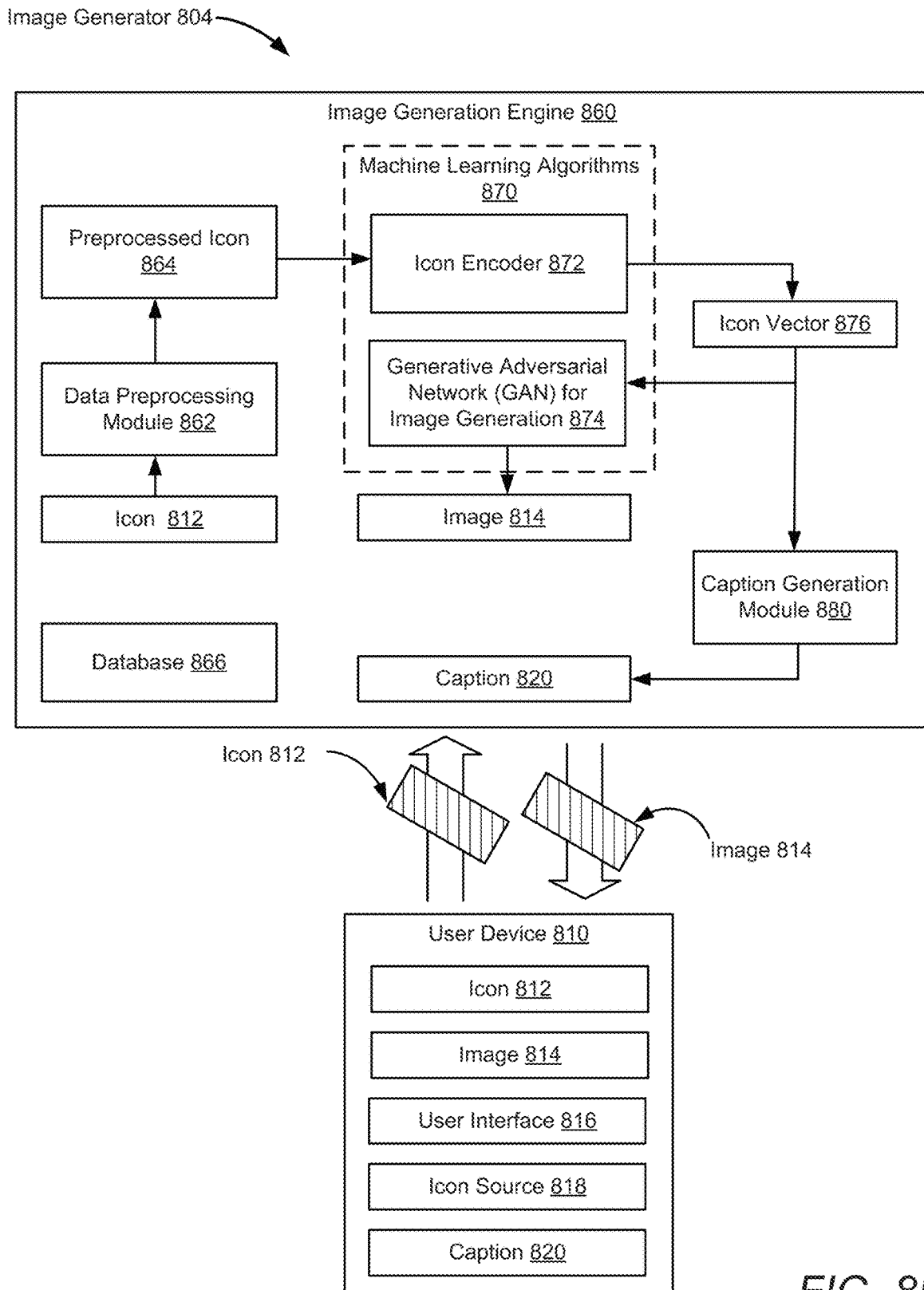

Turning to FIGS. 8A and 8B, FIG. 8A shows a system in accordance with one or more embodiments. As shown in FIG. 8A, an image generation system (800) may obtain icons (e.g., shapes, emojis, logos) (802) and apply an image generator (804) based on machine learning to generate images (e.g., photographs, drawings) (806).

FIG. 8B shows an image generator in accordance with one or more embodiments. As shown in FIG. 8B, the image generator (804) may include an image generation engine (860). The image generator (804) may further include one or more user devices (810) to enable a user to interact with the image generation engine (860), e.g., by providing an icon for which an image is to be generated and receiving the generated image. The image generation engine (860) may obtain the icon (812) from the user device (810). The icon (812) may be selected, e.g., by a user of the user device (810), from a set of icons via a user interface (816). Alternatively, the icon may be provided by the user. For example, the user may capture the icon (812) using a camera (not shown) of the user device (810). The icon may be obtained in any manner, without departing from the disclosure.

In some embodiments, the user device (810) may be a personal computer, a laptop, a tablet, a smartphone, etc., that includes hardware and/or software with functionality for obtaining one or more icons (812) from an icon source (818) such as a file, a database, a camera, etc. The user device (810) may include hardware and/or software to receive user selections via the user interface (816). The user interface (816) may further be used to output (e.g., display) the generated image(s) (814) to the user. The user interface (816) may also be used to output a caption (820) for the image (814) to the user. The image generation engine (860) may be hosted on a server, in a cloud, or on the user device (810). The user device (810) may interface with the image generation engine (860) via any type of communication network to enable transmission of the icon (812) from the user device (810) to the image generation engine (860) and receipt of the image (814) and/or the caption (820) from the image generation engine (860) to the user device (810).

Keeping with FIG. 8B, the image generation engine (860) may include hardware and/or software with functionality for obtaining the icon (812), for processing the icon as discussed below, and for outputting the image (814) and/or the caption (820), resulting from the processing of the icon (812). The image generation engine (820) may be implemented on one or more computing systems of any type, e.g., as shown in FIG. 15. Various operations of the image generation engine may be performed by one or more machine learning models.

The machine learning model(s) may be any type of machine learning model(s). Examples for machine learning models that may be used include, but are not limited to, perceptrons, convolutional neural networks, deep neural networks, recurrent neural networks, support vector machines, regression trees, random forests, extreme learning machines, type I and type II fuzzy logic (T1FL/T2FL), decision trees, inductive learning models, deductive learning models, supervised learning models, unsupervised learning models, reinforcement learning models, etc. In some embodiments, two or more different types of machine-learning models are integrated into a single machine-learning architecture, e.g., a machine-learning model may include support vector machines and neural networks.

In some embodiments, various types of machine learning algorithms, e.g., backpropagation algorithms, may be used to train the machine learning models. In a backpropagation algorithm, gradients are computed for each hidden layer of a neural network in reverse from the layer closest to the output layer proceeding to the layer closest to the input layer. As such, a gradient may be calculated using the transpose of the weights of a respective hidden layer based on an error function (also called a "loss function"). The error function may be based on various criteria, such as mean squared error function, a similarity function, etc., where the error function may be used as a feedback mechanism for tuning weights in the machine-learning model. In some embodiments, existing training data, e.g., images may be augmented to generate synthetic data for training a machine learning model.

With respect to neural networks, for example, a neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled.

Through machine learning, a neural network may determine which data inputs should receive greater priority in determining one or more specified outputs of the neural network. Likewise, these weighted data inputs may be summed such that this sum is communicated through a neuron's activation function to other hidden layers within the neural network. As such, the activation function may determine whether and to what extent an output of a neuron progresses to other neurons where the output may be weighted again for use as an input to the next hidden layer.

Turning to recurrent neural networks, a recurrent neural network (RNN) may perform a particular task repeatedly for multiple data elements in an input sequence (e.g., a sequence of maintenance data or inspection data), with the output of the recurrent neural network being dependent on past computations (e.g., failure to perform maintenance or address an unsafe condition may produce one or more hazard incidents). As such, a recurrent neural network may operate with a memory or hidden cell state, which provides information for use by the current cell computation with respect to the current data input. For example, a recurrent neural network may resemble a chain-like structure of RNN cells, where different types of recurrent neural networks may have different types of repeating RNN cells. Likewise, the input sequence may be time-series data, where hidden cell states may have different values at different time steps during a prediction or training operation. For example, where a deep neural network may use different parameters at each hidden layer, a recurrent neural network may have common parameters in an RNN cell, which may be performed across multiple time steps. To train a recurrent neural network, a supervised learning algorithm such as a backpropagation algorithm may also be used. In some embodiments, the backpropagation algorithm is a backpropagation through time (BPTT) algorithm. Likewise, a BPTT algorithm may determine gradients to update various hidden layers and neurons within a recurrent neural network in a similar manner as used network is trained using a reinforcement learning algorithm such as a deep reinforcement learning algorithm.

Embodiments are contemplated with different types of RNNs. For example, classic RNNs, long short-term memory (LSTM) networks, a gated recurrent unit (GRU), a stacked LSTM that includes multiple hidden LSTM layers (i.e., each LSTM layer includes multiple RNN cells), recurrent neural networks with attention (i.e., the machine-learning model may focus attention on specific elements in an input sequence), bidirectional recurrent neural networks (e.g., a machine-learning model that may be trained in both time directions simultaneously, with separate hidden layers, such as forward layers and backward layers), as well as multidimensional LSTM networks, graph recurrent neural networks, grid recurrent neural networks, etc., may be used. With regard to LSTM networks, an LSTM cell may include various output lines that carry vectors of information, e.g., from the output of one LSTM cell to the input of another LSTM cell. Thus, an LSTM cell may include multiple hidden layers as well as various pointwise operation units that perform computations such as vector addition.

In some embodiments, one or more ensemble learning methods may be used in connection to the machine-learning models. For example, an ensemble learning method may use multiple types of machine-learning models to obtain better predictive performance than available with a single machine-learning model. In some embodiments, for example, an ensemble architecture may combine multiple base models to produce a single machine-learning model. One example of an ensemble learning method is a BAGGing model (i.e., BAGGing refers to a model that performs Bootstrapping and Aggregation operations) that combines predictions from multiple neural networks to add a bias that reduces variance of a single trained neural network model. Another ensemble learning method includes a stacking method, which may involve fitting many different model types on the same data and using another machine-learning model to combine various predictions.

Continuing with the discussion of FIG. 8B, in one or more embodiments, the data preprocessing module (862) performs image preprocessing operations on the icon (812) to generate a preprocessed icon (864). The image preprocessing may involve operations such as a resolution normalization, a contrast and/or brightness normalization, a grayscale conversion, etc. Any preprocessing operations needed or desired to obtain a preprocessed icon in a format suitable as an input to the machine learning models (870) may be performed.

In one or more embodiments, the machine learning algorithms (870) include an icon encoder (872) and a generative adversarial network (GAN) for image generation (874).

The icon encoder (872) may be a first machine learning algorithm (870) trained to generate an icon vector (876) from the preprocessed icon (864) An architecture of the icon encoder (872) is discussed below in reference to FIG. 9, and a method for training the icon encoder (872) is discussed below in reference to FIG. 12. In one or more embodiments, the icon vector (876) includes a lower-dimensional representation of the preprocessed icon (864) in a joint icon-image vector space. In the joint icon-image vector space, the icon vector (876) may contain a condensed version of the preprocessed icon (864). The joint icon-image vector space may consist of N real numbers, where N is the dimensionality of the joint icon-image vector space. While the concept needed to create the image is still fully present in the icon vector, other non-relevant or peripherally relevant content of the icon may not be encoded by the icon vector. In other words, the icon-image vector space is a unique representation that is between icon and image. The dimensionality of the icon vector (876) may be a tunable parameter. If a classification of the icon is desired, a down-stream classifier may operate on the icon vector (876) to perform the classification.

The GAN for image generation (874) may be a second machine learning algorithm (870) trained to generate the image (814) from the icon vector (876). An architecture of the GAN for image generation (874) is discussed below in reference to FIG. 10, and a method for training the GAN for image generation (874) is discussed below in reference to FIG. 13.

The image (814) is a photo or drawing that includes the concept (such as an emotion, action, object or any type of concept) represented by the icon (812). The image may include other elements that may not be related to the concept, e.g., a background, objects, etc. Examples are provided in FIG. 14.

In some embodiments, the image generation engine (860) further includes a caption generation module (880) that translates the icon vector (876) into a caption (820). The caption (820) may include a natural language string of words, including but not limited to a description of the objects, people, actions, emotions, etc. depicted by the image (814). The caption generation module may be based on a sequential machine learning architecture, such as a Long Short-Term Memory (LSTM) or Gated Recurrent Units (GRU) architecture, an attention based architecture such as a transformer to generate a sequence of natural language words to represent the meaning of the vector. Regardless of the type of model that is used, it is assumed that the model is guided to focus on salient features of the image or icon for the caption. In some embodiments, the generated image (814) and caption (820) are provided as an output, e.g., from the image generation engine (860) to the user device (810), where they may be stored, reviewed and/or used by a user.

In one or more embodiments, the image generation engine (860) further includes a database (866). The database may store data to be used for training the machine learning algorithms (870). For example, labeled images and/or icons suitable for a supervised learning-based training of the machine learning algorithms (870) may be stored in the database (866). A discussion of the training of the machine learning algorithms using data stored in the database (866) is provided below in reference to FIGS. 12 and 13.

Figure 9:
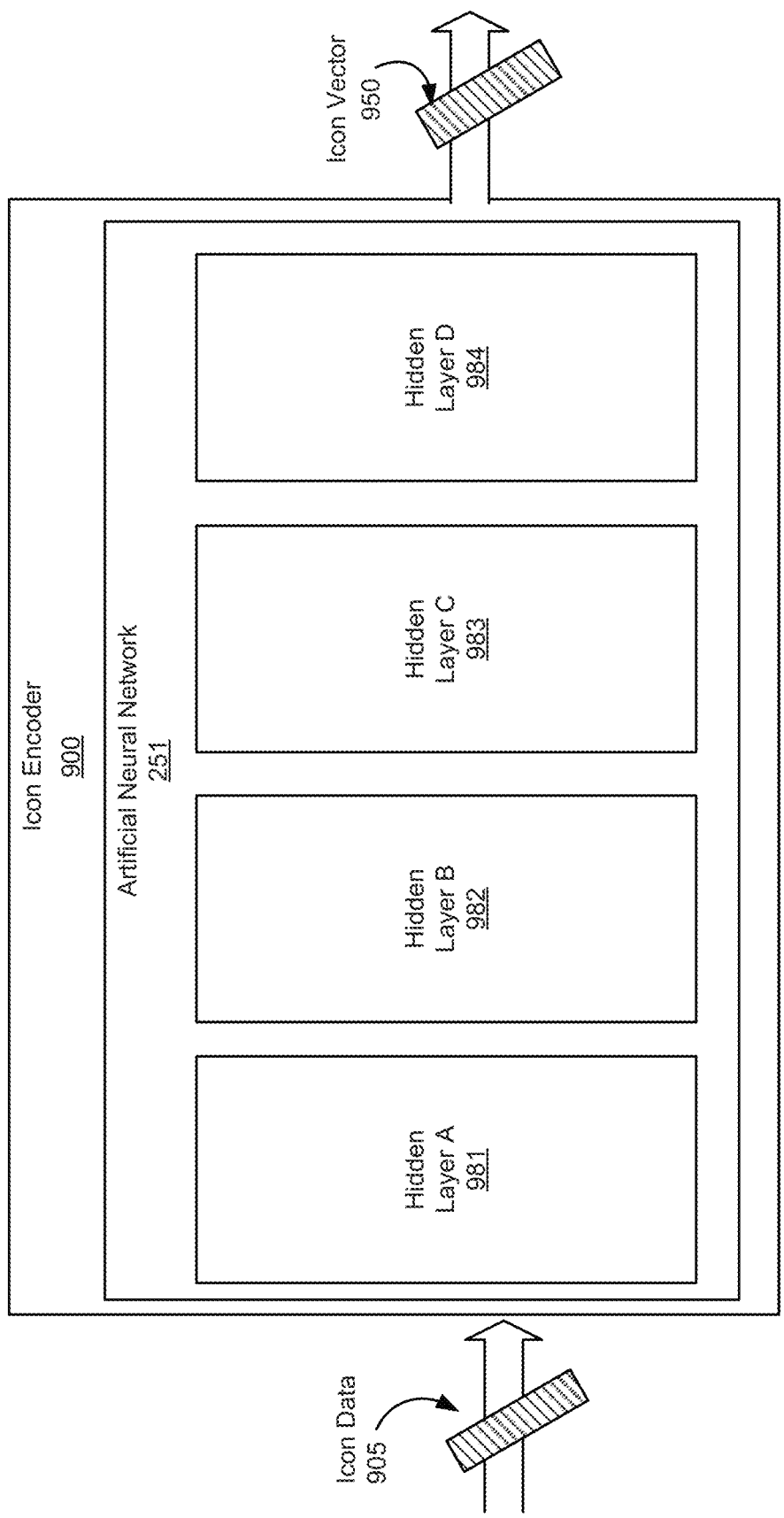
FIGS. 9 and 10 show machine learning models in accordance with one or more embodiments.

FIG. 9 shows an icon encoder in accordance with one or more embodiments. The icon encoder (900), in one or more embodiments, includes an artificial neural network (951), trained to generate an icon vector (950) from the icon data (905). Once trained, the artificial neural network (951) may serve as the icon encoder (872) of FIG. 8B.

In one embodiment, the artificial neural network (951) is a deep neural network (e.g., a convolutional neural network). In the example shown in FIG. 9, the artificial neural network (951) includes four hidden layers (hidden layer A (981), hidden layer B (982), hidden layer C (983), hidden layer D (984)), which may be a convolutional layer, a pooling layer, a rectified linear unit (ReLU) layer, a softmax layer, a regressor layer, a dropout layer, and/or various other hidden layer types. These hidden layers may be arranged in any order as long as they satisfy input/output size criteria. Each layer may include a number of image filters. The output of the image filters may serve as the input to the next layer(s).

In some embodiments, each hidden layer is a combination of a convolutional layer, a pooling layer, and a ReLU layer in a multilayer architecture. For example, each hidden layer (e.g., hidden layer A (981), hidden layer B (982), hidden layer C (983), hidden layer D (984)) may have a convolutional layer, a pooling layer, and a ReLU layer. The hidden layer A (981) and the hidden layer B (982) may be down-sampling blocks to extract high-level features from the icon data (905). Hidden layer C (983) may perform residual stacking as a bottleneck between down-sampling blocks (e.g., hidden layer A (981), hidden layer B (982)). Hidden layer D (984) may include a softmax layer or a regressor layer to classify or predict a predetermined class or a value based on input attributes.

Furthermore, in a convolutional layer, the input is convolved with a set of learned filters, designed to highlight specific characteristics of the input. A pooling layer produces a scaled down version at the output. This is achieved by considering small neighborhood regions and applying the desired operation filter (e.g., min, max, mean, etc.) across the neighborhood. A ReLU layer enhances the nonlinear property of the network by introducing a non-saturating activation function. One example of such a function is thresholding to eliminate negative responses (setting negative values to zero). A fully connected layer provides a high-level reasoning by connecting each node in the layer to all activation nodes in the previous layer. A softmax layer maps the inputs from the previous layer into a value between 0 and 1. A dropout layer offers a regularization technique for reducing network over-fitting on the training data by dropping out individual nodes with a certain probability. A loss layer (utilized in training) defines the weight dependent cost function that needs to be optimized (bring cost down to zero) for improved accuracy. Furthermore, the artificial neural network (951) may include an activation function in a ReLU layer (e.g., hidden layer D (984)) which may be a fully connected layer to represent nonlinear combinations of high-level features at the output of convolutional layers (e.g. hidden layer A (981), hidden layer B (982), hidden layer C (983)) as a vector. As a result, the icon data (905) are flattened into the icon vector (950), by the artificial neural network (951). While FIG. 9 shows a particular architecture, any architecture suitable for generating the icon vector (950) based on the icon data (905) may be used, without departing from the disclosure.

Figure 10:
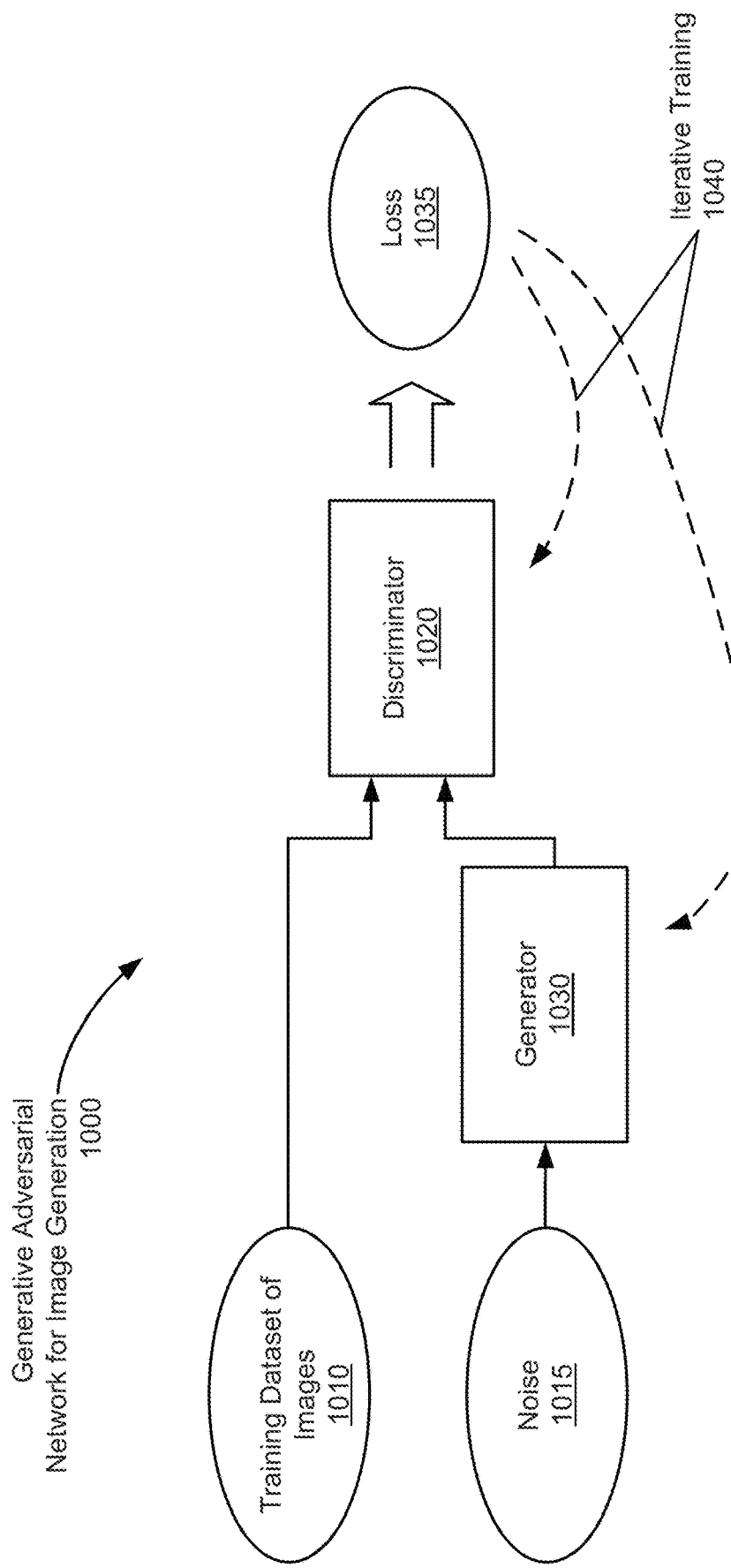

FIG. 10 shows a generative adversarial network (GAN) for image generation in accordance with one or more embodiments. Once trained, the GAN for image generation (1000) may serve as the GAN for image generation (874) in FIG. 8B. The GAN for image generation (1000) includes a generator (1030) and a discriminator (1020), in accordance with one or more embodiments. Both the generator (1030) and the discriminator (1020) may be neural networks. The combination of the generator (1030) and the discriminator (1020) may be trained using libraries of existing images. For example, to train the GAN for icon generation to generate an icon for the activity "people fighting", a library of images known to represent people that are fighting may be used.

During the training of the GAN for image generation (1000), the generator (1030) is provided with noise as the input (1015). Further, the training dataset of images (1010) provides the reference for the discriminator (1020) to decide whether an image generated by the generator (1030) is real or fake. A loss (1035) output provided by the discriminator may be used for an iterative training (1040) of the GAN for image generation (1000). With the iterative training (1040), the capability of the GAN for image generation (1000) to generate images that resemble the images in the training dataset of images (1010), and eventually are no longer distinguishable from the images in the training dataset of images (1010) improves.

Both the generator (1030) and the discriminator (1020) may be neural networks. The discriminator (1020) may be a classifier that is trained to distinguish real images from the images created by the generator (1030). The discriminator may use any network architecture appropriate to the classification of images. The generator (1030) may be an inverse convolutional network. While a standard convolutional classifier takes an image and downsamples the image to produce a probability, the inverse convolutional network of the generator (1030) takes a vector of random noise and upsamples it to an image. The generator (1030) output may be connected directly to the discriminator (1020) input. Through backpropagation, the discriminator's classification provides a signal that the generator uses to update its weights. Once sufficiently trained, the generator (1030) may generate an image from the noise (1015), without the discriminator (1020) being involved. A description of the training of the GAN for image generation is provide below in reference to FIG. 13. Although not shown in FIG. 10, in one or more embodiments, the GAN for image generation (1000) includes an additional input for the icon vector. The icon vector may condition the GAN, depending on what the icon vector represents. For example, if the icon vector represents the concept "people fighting", the GAN may be conditioned to generate an image that includes the concept of "people fighting". In other words, the GAN for image generation may operate as a conditional GAN.

While FIGS. 8A, 8B, 9, and 10 show various configurations of components, other configurations may be used without departing from the scope of the disclosure. For example, various components in FIGS. 8B, 9, and 10 may be combined to create a single component. As another example, the functionality performed by a single component may be performed by two or more components.

Figure 11:
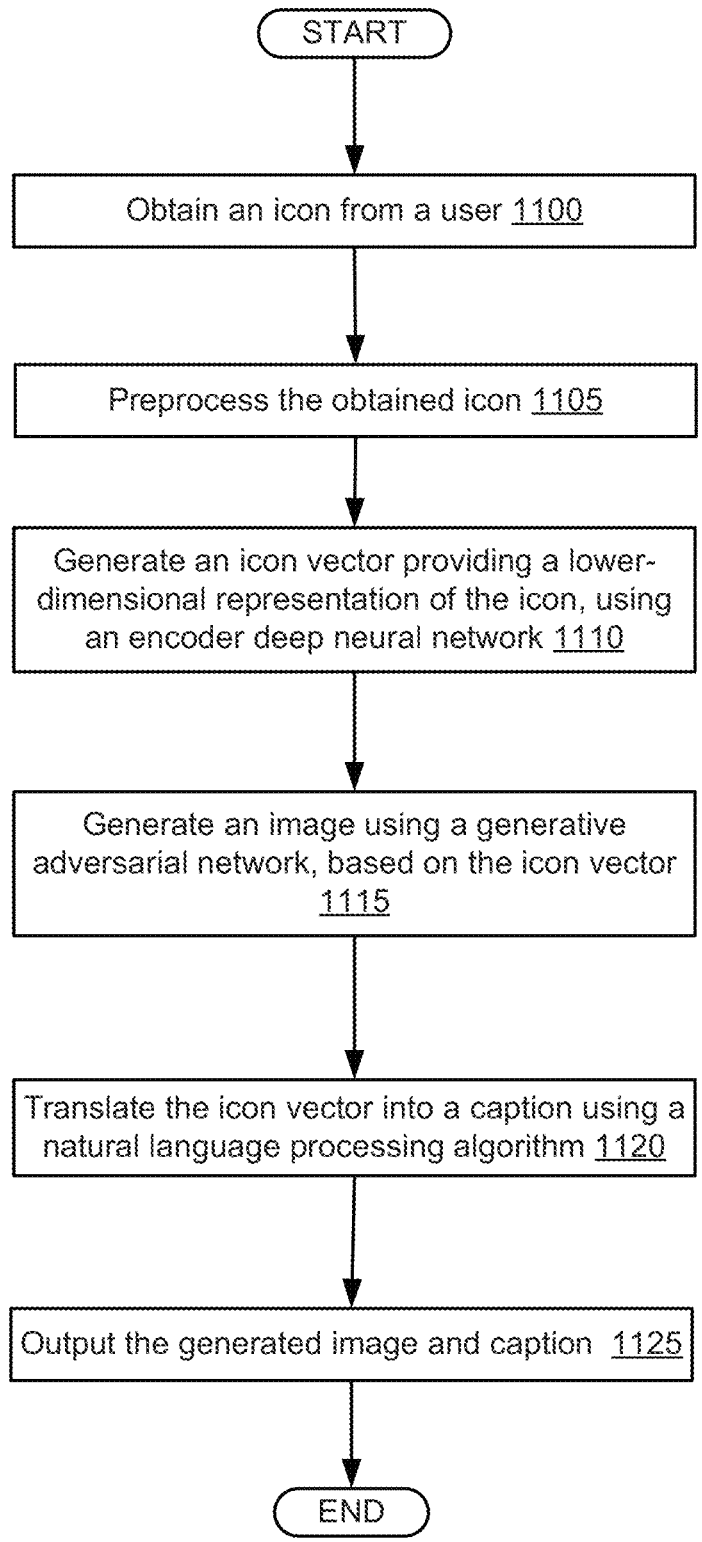
FIGS. 11, 12, and 13 show flowcharts in accordance with one or more embodiments.

Turning to FIG. 11, FIG. 11 shows a flowchart in accordance with one or more embodiments. Specifically, FIG. 11 describes a general method for generating an image based on an icon, in accordance with one or more embodiments. One or more blocks in FIG. 11 may be performed by one or more components (e.g., an icon encoder (900), a generative adversarial network for image generation (1000)) as described in FIGS. 8B, 9, and 10. While the various blocks in FIG. 11 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 1100, an icon is obtained from a user in accordance with one or more embodiments. For example, the icon is typically selected by a user device or a user to represent an emotion and concept (e.g., a concept of "people fighting"). As another example, the icon may be selected from a database.

In Block 1105, the obtained icon is preprocessed in accordance with one or more embodiments. For example, the obtained icon may be normalized in size contrast, etc. The preprocessing may include operations as previously described in reference to FIG. 8B.

In Block 1110, an icon vector is generated from the icon, after the preprocessing. The icon vector may be generated by an icon encoder operating on the preprocessed icon, as described in reference to FIG. 8B. The icon vector may be in a joint icon-image vector space and may encode the concept represented by the icon. Prior to the execution of Block 1110, the icon encoder may be trained as described below in reference to FIG. 12.

In Block 1115, an image is generated using a generative adversarial network (GAN) based on the icon vector, in accordance with one or more embodiments. The image may be generated by the GAN operating on a noise input. More specifically, a generator (previously described in reference to FIG. 10) may generate the image from the noise at the input of the generator. Accordingly, depending on the noise, different images may be generated by the GAN, although all images that are generated may include the concept encoded by the icon vector (e.g., concepts such as "people fighting", "people talking", "people dancing" or any other concept as previous defined). The icon vector may serve as a conditional input that conditions the GAN to generate an image according to the concept encoded by the icon vector. Prior to the execution of Block 1115, the GAN may be trained as described below in reference to FIG. 13.

In Block 1120, the icon vector is translated into a caption using a natural language processing algorithm in accordance with one or more embodiments. For example, the image generation engine maps the icon vector to a caption in a predetermined list of captions (e.g., "people laughing", "people fighting", "people drinking", "people playing").

In Block 1125, the generated image and caption are outputted in accordance with one or more embodiments. For example, a user device may display the generated image and caption for a user to evaluate if the generated image and caption are consistent with the intended emotions and contents for a user. Further, the generate image and/or caption may be stored, shared, etc.

While not explicitly shown in FIG. 11, the method may select an image from a library of images, instead of generating the image. In the library, the images may be labeled to indicate the concept(s) associated with the images in the library. For example, an image vector similar to the icon vector may be assigned to each image. In this case, the selection of the image from the library may be performed by picking the image for which the image vector is closest to the icon vector. Any other method for selection of an image may be used without departing from the disclosure. If the image is selected rather than generated, the execution of Block 1115 may not be necessary.

Figure 12:
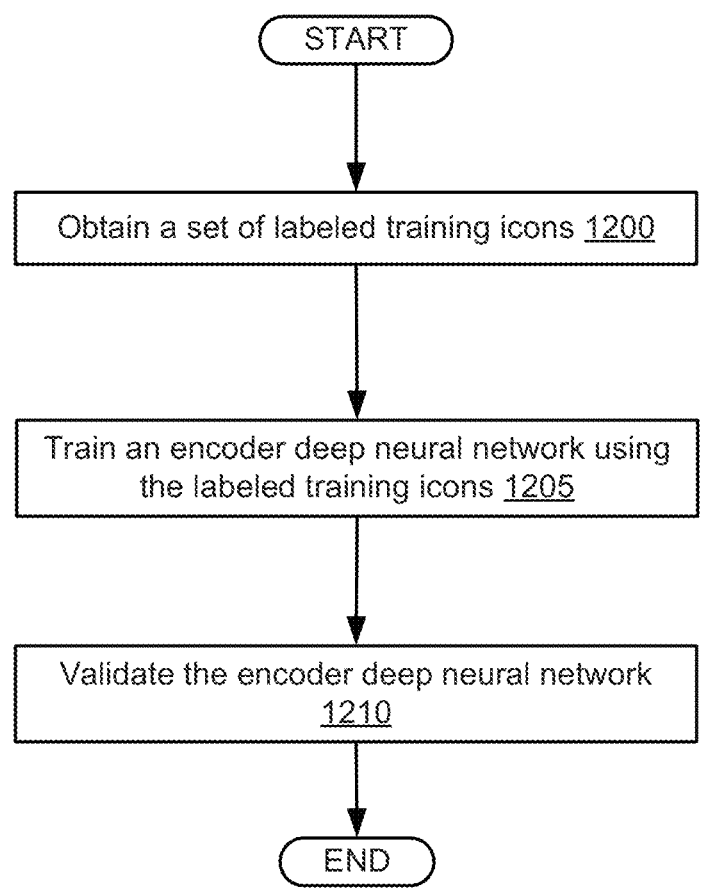
Figure 13:
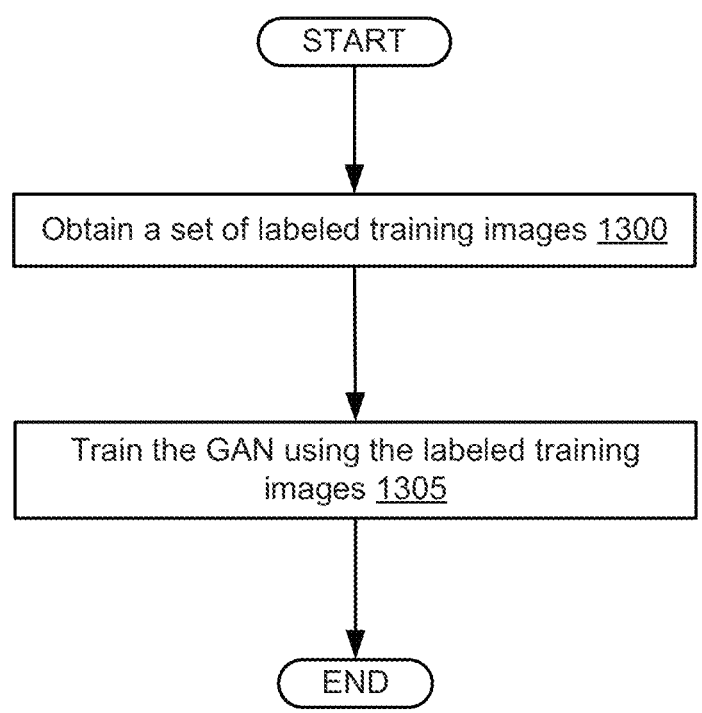

The following flowcharts of FIGS. 12 and 13 describe methods for training the machine learning algorithms that may be used for the execution of the method of FIG. 11. The machine learning models may be jointly or alternatingly trained to maximize performance.

FIG. 12 shows a flowchart in accordance with one or more embodiments. Specifically, FIG. 12 describes a method for training an icon encoder. While the various blocks in FIG. 12 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 1200, a set of labeled training icons are obtained in accordance with one or more embodiments. For example, the set of training icons includes emojis and/or symbols that are labeled to identify one or more concepts (e.g., "people fighting", "people laughing", "people hugging", etc.) present in the training icons. An example of a database that may be used for training is the Remix Icon database (remixicon.com). Any other database that provides labeled training icons may be used without departing from the disclosure.

In Block 1205, the icon encoder, e.g., an encoder deep neural network, is trained using the labeled training icons in accordance with one or more embodiments. Any type of supervised learning as previously described may be used to train the icon encoder, using the training icons and the corresponding labels.

In Block 1210, the icon encoder that is being trained is validated in accordance with one or more embodiments. Iterations of the training of Block 1205 and the validation of Block 1210 may be performed until satisfactory performance (e.g., a desired classification accuracy) is achieved or until a prespecified number of iterations have been completed. A data split technique may be used to separate the available set of training icons into sets for training and validation. For example, a 70/30 or 80/20 split may be used.

FIG. 13 shows a flowchart in accordance with one or more embodiments. Specifically, FIG. 13 describes a method for training a GAN for image generation. While the various blocks in FIG. 13 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 1300, a set of labeled training images are obtained in accordance with one or more embodiments. For example, the set of training images includes photographs and/or drawings that are labeled to identify one or more concepts (e.g., "people fighting", "people laughing", "people hugging", etc.) represented by the training images. An example of a database that may be used for training is the ImageNet database (www.image-net.org). Any other database that provides labeled training images may be used without departing from the disclosure.

In Block 1305, a generative adversarial network (GAN) is trained using the labeled training images in accordance with one or more embodiments. The training may involve the training of the discriminator and the training of the generator of the GAN.

The training of the discriminator may be performed based on real data and fake data. The real data may include images that properly include a concept, whereas the fake data may include images that may not include the concept. The real data may be sampled from the labeled training images. The fake data may be obtained by shuffling the labels of the labeled training images, or using otherwise improperly labeled images. The discriminator may be trained to perform a binary classification task using the real and the fake data. Any kind of supervised training method, e.g., using backpropagation, may be used. The generator may not be trained while the discriminator is trained.

The training of the generator may be performed using the discriminator, the labeled training images, and the noise input. During the training, the generator learns to generate images that are no longer distinguishable from the labeled training images, by the discriminator. Because of the randomness in the noise input, the generated images have variations, despite being indistinguishable from the labeled training images, by the discriminator. The generator feeds into the discriminator, and the discriminator produces an output to be optimized by the training. More specifically, the generator is penalized for producing an image that the discriminator network classifies as fake. Accordingly, the discriminator is included in the backpropagation, and the backpropagation adjusts the weights of the generator to increase the likeliness that the produced image is no longer recognized as a fake. The training may continue until a satisfactory performance (e.g., a percentage of detected fakes below a prespecified threshold) is achieved. The described training may be performed for different icon vectors representing different concepts. Further, as part of the training, the icon encoder may be updated, i.e., the training may alternate between the methods of FIGS. 12 and 13 to optimize overall performance.

Figure 14:
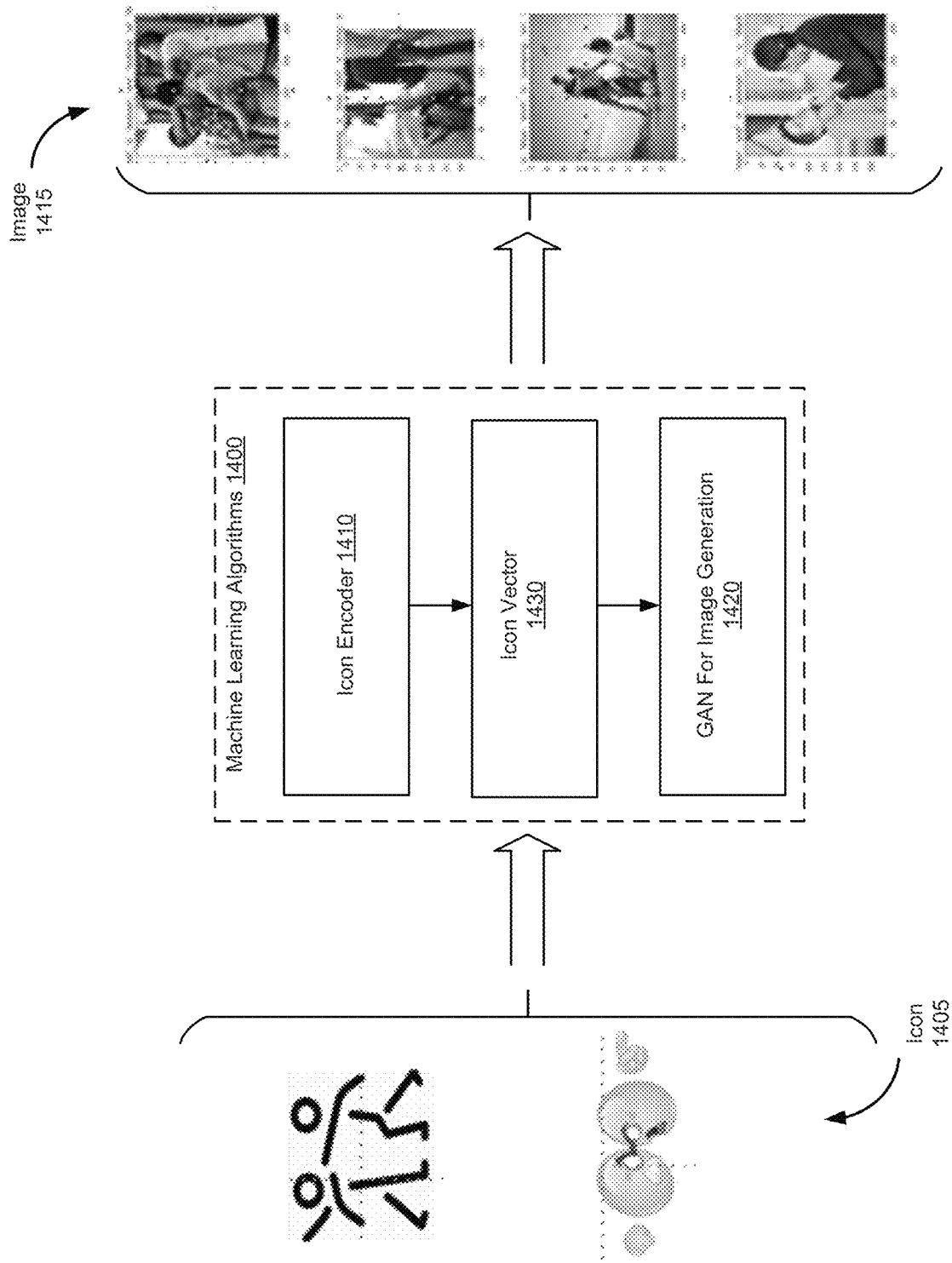
FIG. 14 shows an example in accordance with one or more embodiments.

FIG. 14 shows an example of a method for automated generation of images from icons, using machine learning algorithms (1400). In the example, an icon encoder (1410) processes an input icon (e.g., one of the icons (1405)) to generate an icon vector (1430). Next, a GAN for image generation (1420) produces an image (1415) based on the icon vector (1430). Which one of the images (1415) is generated may depend on the noise input to the GAN for image generation (1420). In other words, for the same icon (1405), different outputs, in this case including the concept "people fighting" may be generated.

In general, in one aspect, embodiments relate to a method comprising: obtaining an icon; generating an icon vector from the icon using an encoder deep neural network; generating an image based on the icon vector using a generative adversarial network (GAN); and outputting the image.

Embodiments further relate to a method wherein the icon is one selected from a group consisting of a shape, a logo, and an emoji.

Embodiments further relate to a method wherein the icon depicts at least one selected from a group consisting of an object, an action, and an emotion, that is present in the image.

Embodiments further relate to a method wherein the icon vector establishes a joint icon-image vector space.

Embodiments further relate to a method that further comprises: translating the icon vector into a caption.

Embodiments further relate to a method that further comprises, prior to generating the icon vector: preprocessing the icon, comprising: transforming the icon to a format compatible with the encoder deep neural network.

Embodiments further relate to a method that further comprises: training the encoder deep neural network to generate the icon vector from the icon using a set of labeled training icons.

Embodiments further relate to a method that further comprises: training the GAN to generate the image from the icon vector using a set of labeled training images.

Embodiments further relate to a method wherein outputting the image comprises one selected from a group consisting of displaying the image to a user, and storing the image.

In general, in one aspect, embodiments relate to a system, comprising: an image generation engine comprising at least one processor, the image generation engine configured to: obtain an icon; generate an icon vector from the icon using an encoder deep neural network; generate an image based on the icon vector using a generative adversarial network (GAN); and output the image.

Embodiments further relate to a system wherein the icon is one selected from a group consisting of a shape, a logo, and an emoji.

Embodiments further relate to a system wherein the icon depicts at least one selected from a group consisting of an object, an action, and an emotion that is present in the image.

Embodiments further relate to a system wherein the icon vector establishes a joint icon-image vector space.

Embodiments further relate to a system wherein the image generation engine is further configured to: translate the icon vector into a caption.

Embodiments further relate to a system wherein the image generation engine is further configured to, prior to generating the icon vector: preprocess the icon, comprising: transforming the icon to a format compatible with the encoder deep neural network.

Embodiments further relate to a system wherein the image generation engine is further configured to: train the encoder deep neural network to generate the icon vector from the icon using a set of labeled training icons.

Embodiments further relate to a system wherein the image generation engine is further configured to: train the GAN to generate the image from the icon vector using a set of labeled training images.

Embodiments further relate to a system that further comprises a user interface, wherein outputting the image comprises displaying the image to a user, in the user interface.

In general, in one aspect, embodiments relate to a non-transitory computer readable medium storing instructions executable by a computer processor, the instructions comprising functionality for: obtaining an icon; generating an icon vector from the icon using an encoder deep neural network; generating an image based on the icon vector using a generative adversarial network (GAN); and outputting the image.

Embodiments further relate to a non-transitory computer readable medium wherein the icon is one selected from a group consisting of a shape, a logo, and an emoji.

Embodiments may be implemented on a computer system. FIG. 15 is a block diagram of a computer system (1502) used to provide computational functionalities associated with described algorithms, methods, functions, processes, flows, and procedures as described in the instant disclosure, according to an implementation. The illustrated computer (1502) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1502) may include a computer that includes an input device, such as a keypad, keyboard, touch screen, or other device that can accept user information, and an output device that conveys information associated with the operation of the computer (1502), including digital data, visual, or audio information (or a combination of information), or a GUI.

The computer (1502) can serve in a role as a client, network component, a server, a database or other persistency, or any other component (or a combination of roles) of a computer system for performing the subject matter described in the instant disclosure. The illustrated computer (1502) is communicably coupled with a network (1530). In some implementations, one or more components of the computer (1502) may be configured to operate within environments, including cloud-computing-based, local, global, or other environment (or a combination of environments).

At a high level, the computer (1502) is an electronic computing device operable to receive, transmit, process, store, or manage data and information associated with the described subject matter. According to some implementations, the computer (1502) may also include or be communicably coupled with an application server, e-mail server, web server, caching server, streaming data server, business intelligence (BI) server, or other server (or a combination of servers).

The computer (1502) can receive requests over network (1530) from a client application (for example, executing on another computer (1502)) and responding to the received requests by processing the said requests in an appropriate software application. In addition, requests may also be sent to the computer (1502) from internal users (for example, from a command console or by other appropriate access method), external or third-parties, other automated applications, as well as any other appropriate entities, individuals, systems, or computers.

Each of the components of the computer (1502) can communicate using a system bus (1503). In some implementations, any or all of the components of the computer (1502), both hardware or software (or a combination of hardware and software), may interface with each other or the interface (1504) (or a combination of both) over the system bus (1503) using an application programming interface (API) (1512) or a service layer (1513) (or a combination of the API (1512) and service layer (1513). The API (1512) may include specifications for routines, data structures, and object classes. The API (1512) may be either computer-language independent or dependent and refer to a complete interface, a single function, or even a set of APIs. The service layer (1513) provides software services to the computer (1502) or other components (whether or not illustrated) that are communicably coupled to the computer (1502). The functionality of the computer (1502) may be accessible for all service consumers using this service layer. Software services, such as those provided by the service layer (1513), provide reusable, defined business functionalities through a defined interface. For example, the interface may be software written in JAVA, C++, or other suitable language providing data in extensible markup language (XML) format or other suitable format. While illustrated as an integrated component of the computer (1502), alternative implementations may illustrate the API (1512) or the service layer (1513) as stand-alone components in relation to other components of the computer (1502) or other components (whether or not illustrated) that are communicably coupled to the computer (1502). Moreover, any or all parts of the API (1512) or the service layer (1513) may be implemented as child or sub-modules of another software module, enterprise application, or hardware module without departing from the scope of this disclosure.

The computer (1502) includes an interface (1504). Although illustrated as a single interface (1504) in FIG. 15, two or more interfaces (1504) may be used according to particular needs, desires, or particular implementations of the computer (1502). The interface (1504) is used by the computer (1502) for communicating with other systems in a distributed environment that are connected to the network (1530). Generally, the interface (1504) includes logic encoded in software or hardware (or a combination of software and hardware) and operable to communicate with the network (1530). More specifically, the interface (1504) may include software supporting one or more communication protocols associated with communications such that the network (1530) or interface's hardware is operable to communicate physical signals within and outside of the illustrated computer (1502).

The computer (1502) includes at least one computer processor (1505). Although illustrated as a single computer processor (1505) in FIG. 15, two or more processors may be used according to particular needs, desires, or particular implementations of the computer (1502). Generally, the computer processor (1505) executes instructions and manipulates data to perform the operations of the computer (1502) and any algorithms, methods, functions, processes, flows, and procedures as described in the instant disclosure.

The computer (1502) also includes a memory (1506) that holds data for the computer (1502) or other components (or a combination of both) that can be connected to the network (1530). For example, memory (1506) can be a database storing data consistent with this disclosure. Although illustrated as a single memory (1506) in FIG. 15, two or more memories may be used according to particular needs, desires, or particular implementations of the computer (1502) and the described functionality. While memory (1506) is illustrated as an integral component of the computer (1502), in alternative implementations, memory (1506) can be external to the computer (1502).

The application (1507) is an algorithmic software engine providing functionality according to particular needs, desires, or particular implementations of the computer (1502), particularly with respect to functionality described in this disclosure. For example, application (1507) can serve as one or more components, modules, applications, etc. Further, although illustrated as a single application (1507), the application (1507) may be implemented as multiple applications (1507) on the computer (1502). In addition, although illustrated as integral to the computer (1502), in alternative implementations, the application (1507) can be external to the computer (1502).

There may be any number of computers (1502) associated with, or external to, a computer system containing computer (1502), each computer (1502) communicating over network (1530). Further, the term "client," "user," and other appropriate terminology may be used interchangeably as appropriate without departing from the scope of this disclosure. Moreover, this disclosure contemplates that many users may use one computer (1502), or that one user may use multiple computers (1502).

In some embodiments, the computer (1502) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method, comprising:
obtaining an image;
generating an image vector from the image using an encoder deep neural network;
generating an icon based on the image vector using a generative adversarial network (GAN);
training at least one of:
the encoder deep neural network to generate the image vector from the image using a set of labeled training images, and
the GAN to generate the icon based on the image vector using a set of labeled training icons; and
outputting the icon.

2. The method of claim 1,
wherein the icon is one selected from a group consisting of a shape, a logo, and an emoji.

3. The method of claim 1, wherein the icon depicts at least one selected from a group consisting of an object, an action, and an emotion that is present in the image.

4. The method of claim 1, wherein the image vector establishes a joint image-icon vector space.

5. The method of claim 1, further comprising:
translating the image vector into a caption.

6. The method of claim 1, further comprising, prior to generating the image vector:
preprocessing the image, comprising: transforming the image to a format compatible with the encoder deep neural network.

7. The method of claim 1, wherein outputting the icon comprises one selected from a group consisting of displaying the icon to a user, and storing the icon.

8. A system, comprising:
an icon generation engine comprising at least one processor, the icon generation engine configured to:
obtain an image;
generate an image vector from the image using an encoder deep neural network;
generate an icon based on the image vector using a generative adversarial network (GAN);
train at least one of:
the encoder deep neural network to generate the image vector from the image using a set of labeled training images, and
the GAN to generate the icon based on the image vector using a set of labeled training icons; and
output the icon.

9. The system of claim 8,
wherein the icon is one selected from a group consisting of a shape, a logo, and an emoji.

10. The system of claim 8, wherein the icon depicts at least one selected from a group consisting of an object, an action, and an emotion that is present in the image.

11. The system of claim 8, wherein the image vector establishes a joint image-icon vector space.

12. The system of claim 8, wherein the icon generation engine is further configured to:
translate the image vector into a caption.

13. The system of claim 8, wherein the icon generation engine is further configured to, prior to generating the image vector:
preprocess the image, comprising: transforming the image to a format compatible with the encoder deep neural network.

14. The system of claim 8, further comprising a user interface,
wherein outputting the icon comprises displaying the icon to a user, in the user interface.

15. A non-transitory computer readable medium storing instructions executable by a computer processor, the instructions comprising functionality for:
obtaining an image;
generating an image vector from the image using an encoder deep neural network;
generating an icon based on the image vector using a generative adversarial network (GAN);
training at least one of:
the encoder deep neural network to generate the image vector from the image using a set of labeled training images, and
the GAN to generate the icon based on the image vector using a set of labeled training icons; and
outputting the icon.

16. The non-transitory computer readable medium of claim 15, wherein the icon is one selected from a group consisting of a shape, a logo, and an emoji.

17. The non-transitory computer readable medium of claim 15, wherein the icon depicts at least one selected from a group consisting of an object, an action, and an emotion that is present in the image.

18. The non-transitory computer readable medium of claim 15, wherein the image vector establishes a joint image-icon vector space.

19. The non-transitory computer readable medium of claim 15, further comprising:

translating the image vector into a caption.

20. The non-transitory computer readable medium of claim 15, further comprising, prior to generating the image vector:

preprocessing the image, comprising: transforming the image to a format compatible with the encoder deep neural network.

* * * * *